(12) United States Patent  
Dayson

(10) Patent No.: US 10,514,019 B2  
(45) Date of Patent: Dec. 24, 2019

(54) FLOATING PIEZOELECTRIC ASSEMBLY FOR GENERATING ENERGY FROM WAVES

(71) Applicant: Gaynor Dayson, Denman Island (CA)

(72) Inventor: Clive Dayson, Denman Island (CA)

(73) Assignee: Gaynor Dayson, British Columbia (CA)

( * ) Notice: Subject to any disclaimer, the term of this patent is extended or adjusted under 35 U.S.C. 154(b) by 36 days.

(21) Appl. No.: 15/660,888

(22) Filed: Jul. 26, 2017

(65) Prior Publication Data

US 2018/0030954 A1 Feb. 1, 2018

Related U.S. Application Data

(60) Provisional application No. 62/367,043, filed on Jul. 26, 2016.

(51) Int. Cl.
  *F03B 13/18* (2006.01)
  *H02N 2/18* (2006.01)

(52) U.S. Cl.
  CPC .......... *F03B 13/188* (2013.01); *H02N 2/185* (2013.01); *F05B 2220/709* (2013.01); *F05B 2240/311* (2013.01); *F05B 2240/93* (2013.01)

(58) Field of Classification Search
  CPC .......... F03B 13/188; H02N 2/18; H02N 2/185
  (Continued)

(56) References Cited

U.S. PATENT DOCUMENTS 4,110,630 A    8/1978 Hendel
4,210,821 A *  7/1980 Cockerell ............... F03B 13/20
                                          290/53

(Continued)

FOREIGN PATENT DOCUMENTS

EP    0274528    3/1992
EP    1115976    2/2004
            (Continued)

OTHER PUBLICATIONS

Tanaka, Y., Oko, T., Mutsuda, H., Patel, R., McWilliam, S. and Popov, A.A., An Experimental Study of Wave Power Generation Using a Flexible Piezoelectric Device, Journal of Ocean and Wind Energy, Feb. 2015, pp. 28-36, vol. 2, No. 1.

(Continued)

*Primary Examiner* — Viet P Nguyen
(74) *Attorney, Agent, or Firm* — Cameron IP

(57) ABSTRACT

A floating piezoelectric assembly for generating energy from waves is provided. The assembly includes a flexible buoyant planar member, an elastic planar member coupled to the same, and two spaced-apart layers of piezoelectric elements extending on and firmly attaching to the top and bottom of the elastic planar member. The elements of a first of the layers are staggered relative to the elements of a second of the layers. The assembly includes a weighted planar member coupled to the buoyant planar member. According to a second aspect, the assembly comprises a first plurality of longitudinally spaced-apart elongate buoyant planar members, a second plurality of longitudinally spaced-apart elongate buoyant planar members, and a series of piezoelectric elements extending between the first and second plurality of buoyant planar members. The assembly further includes a plurality of elastic planar members to which respective ones of the piezoelectric elements couple.

20 Claims, 23 Drawing Sheets

(58) Field of Classification Search
USPC .................................. 290/42, 53; 310/339
See application file for complete search history.

(56) References Cited

U.S. PATENT DOCUMENTS

| | | | | |
|---|---|---|---|---|
| 4,404,490 | A * | 9/1983 | Taylor | F03B 13/14 |
| | | | | 290/42 |
| 4,809,243 | A | 2/1989 | Bledsoe et al. | |
| 5,107,162 | A | 4/1992 | Yamaguchi | |
| 5,132,550 | A * | 7/1992 | McCabe | B01D 61/10 |
| | | | | 290/53 |
| 5,494,468 | A | 2/1996 | Demarco, Jr. | |
| 5,548,177 | A | 8/1996 | Carroll | |
| 5,552,657 | A | 9/1996 | Epstein et al. | |
| 5,578,889 | A * | 11/1996 | Epstein | F03B 13/14 |
| | | | | 290/53 |
| 5,814,921 | A | 9/1998 | Carroll | |
| 8,193,655 | B2 | 6/2012 | Roberts et al. | |
| 8,415,819 | B2 | 4/2013 | Sapir et al. | |
| 8,633,608 | B2 | 1/2014 | Grey et al. | |
| 8,767,505 | B2 * | 7/2014 | Welker | F03B 13/00 |
| | | | | 290/54 |
| 8,878,381 | B2 | 11/2014 | Henry | |
| 8,928,206 | B2 | 1/2015 | Schapeler et al. | |
| 8,933,573 | B2 | 1/2015 | Jo | |
| 2007/0228737 | A1 | 10/2007 | Hirsch | |
| 2007/0240624 | A1 | 10/2007 | Collee et al. | |
| 2008/0267712 | A1 * | 10/2008 | Jean | E02B 9/08 |
| | | | | 405/76 |
| 2010/0019498 | A1 * | 1/2010 | Pollack | F03B 13/188 |
| | | | | 290/53 |
| 2010/0314871 | A1 * | 12/2010 | Jean | F03B 13/185 |
| | | | | 290/42 |
| 2011/0006532 | A1 * | 1/2011 | Grey | F03B 13/148 |
| | | | | 290/53 |
| 2011/0298215 | A1 | 12/2011 | Wille et al. | |
| 2012/0097752 | A1 | 4/2012 | Okano et al. | |
| 2012/0104761 | A1 | 5/2012 | Vamvas | |
| 2012/0169055 | A1 | 7/2012 | Rastegar et al. | |
| 2013/0255247 | A1 * | 10/2013 | Zakheos | F03B 13/188 |
| | | | | 60/501 |
| 2014/0319969 | A1 * | 10/2014 | Denes | F03B 13/14 |
| | | | | 310/339 |
| 2015/0285212 | A1 | 10/2015 | Wu et al. | |

FOREIGN PATENT DOCUMENTS

| | | |
|---|---|---|
| EP | 2071365 | 6/2009 |
| GB | 2376796 | 12/2002 |
| GB | 2475049 | 5/2011 |
| WO | 1980001674 | 8/1980 |
| WO | 1996025769 | 8/1996 |
| WO | 2006121818 | 11/2006 |
| WO | 2007071975 | 6/2007 |
| WO | 2008156606 | 12/2008 |
| WO | 2010011562 | 1/2010 |
| WO | 2010085690 | 7/2010 |
| WO | 2011065838 | 6/2011 |
| WO | 2013017400 | 2/2013 |

OTHER PUBLICATIONS

PI Ceramic, "Piezoelectric Ceramic Products: Fundamentals, Characteristics and Applications", CAT125E, Feb. 14, 2017.

* cited by examiner

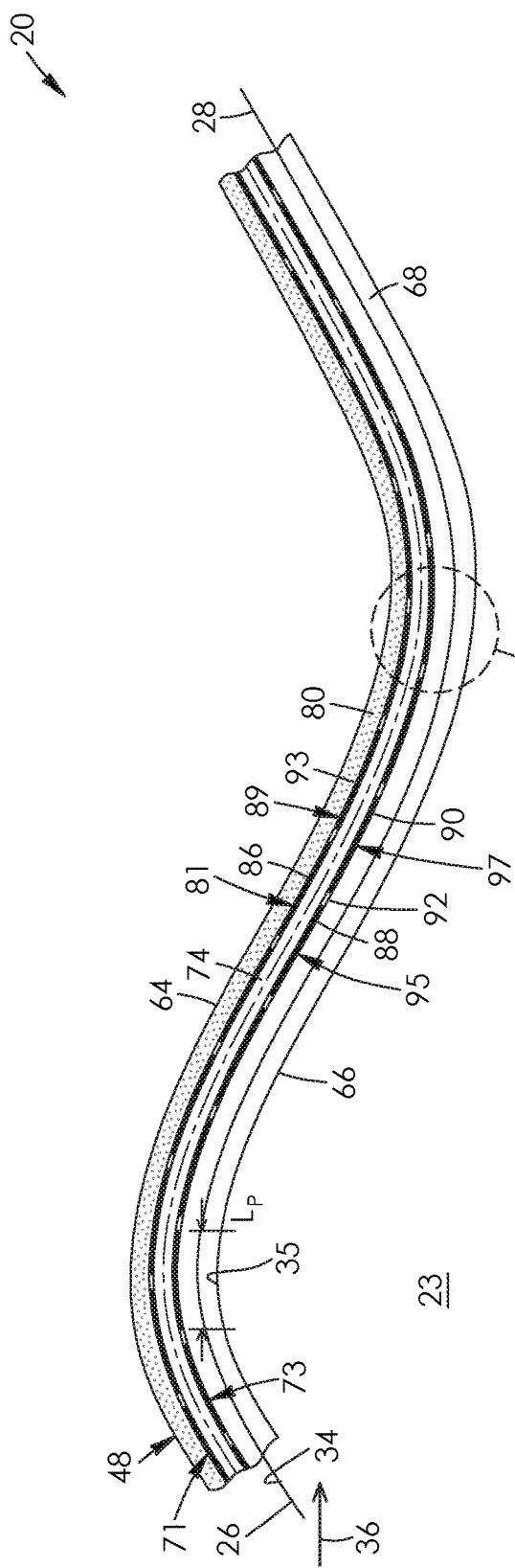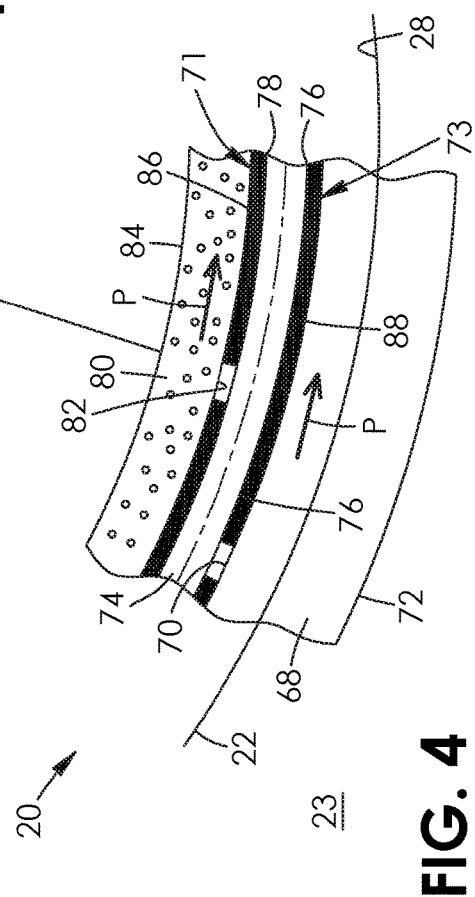

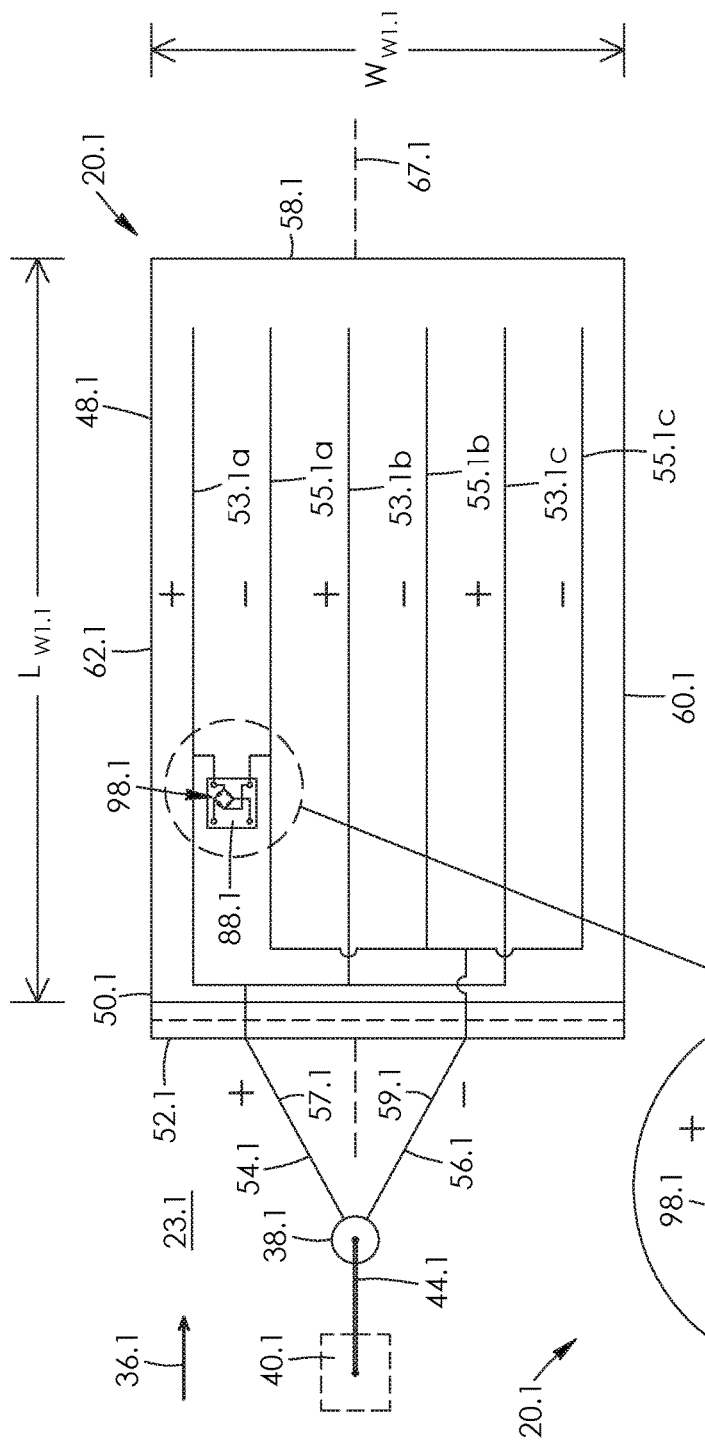
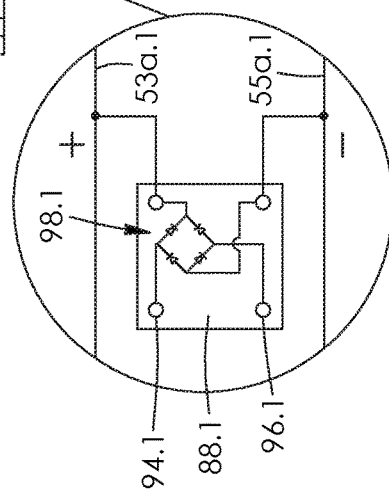
FIG. 13
FIG. 14

FLOATING PIEZOELECTRIC ASSEMBLY FOR GENERATING ENERGY FROM WAVES

BACKGROUND OF THE INVENTION

Field of the Invention

There is provided a floating piezoelectric assembly. In particular, there is provided a floating piezoelectric assembly for generating energy from waves.

Description of the Related Art

U.S. Pat. No. 4,404,490 to Taylor et al. discloses a power generating piezoelectric structure for the purpose of converting the mechanical energy of surface waves on bodies of water. The structure includes piezoelectric material members, preferably in the form of one or a laminate of sheets of such material. Each sheet has an electrode on opposite surfaces thereof. Each pair of electrodes and the piezoelectric material therebetween define a power generating element. Each power generating element is preferably dimensioned, relative to the wave lengths of selected waves on the body of water in which the generator is to be used, for increasing the efficiency of power conversion. A support means is provided for maintaining the structure in a preselected position within and below the surface of the water. Preferably, the piezoelectric generating elements are flexible and are supported in such manner to allow flexure thereof in response to movement of the surrounding water. In certain embodiments, the elements are designed to enter into mechanical resonance in response to the passage of waves thereover, such flexure and/or resonance increasing the mechanical coupling efficiency between the waves and the elements.

United States Patent Application Publication No. 2014/0319969 to Denes et al. discloses a device for generating electrical energy from the motion of waves. The device comprises at least one flexible, floatable tube which is closed at its two ends. The tube includes a wall having at least one horizontal stack, which extends in the longitudinal direction of the tube and has at least one layer having one tier made of an electroactive polymer and at least one tier serving as a flexible electrode. The tube is exposed to the wave motions of water such that sections of the stacks are strained or compressed. The layers of the electroactive polymers in the compressed sections are charged with the aid of control electronics, and thereafter excess electrical energy resulting from relaxation of these sections and the associated separation of the charges in the electroactive polymer is extracted by a capacitive discharge.

U.S. Pat. No. 8,767,505 to Welker discloses a method for conducting seismic operations. The method includes the steps of deploying a seismic streamer carrying an electrically powered device from a vessel into water having waves. The method includes providing an in-sea generator in electrical connection with the device. The method includes producing electricity from the in-sea generator by harvesting mechanical energy from the waves. The method includes providing the produced electricity to the device.

BRIEF SUMMARY OF INVENTION

There are provided, and it is an object to provide, improved piezoelectric assemblies for generating energy from waves. Electricity is generated by piezoelectric, elastic beams that are bending under the action of the waves.

According to a first aspect, there is accordingly provided an assembly for generating energy from waves. The assembly is shaped to blanket a portion of a plurality of the waves. The assembly includes a buoyant planar member that is flexible and an elastic planar member that extends along, operatively couples to and is coplanar the buoyant planar member. The assembly includes a plurality of piezoelectric elements extending along the elastic planar member. In this example, the elastic planar member is pre-stressed in tension while the piezoelectric elements are being bonded thereto in order to pre-compress the piezoelectric material so that the material is less prone to cracking at the tops and in the troughs of the steeper waves.

The plurality of piezoelectric elements include a first layer of piezoelectric elements and a second layer of piezoelectric elements spaced-apart from and staggered relative to the first layer of piezoelectric elements. The elastic planar member is between the first layer of piezoelectric elements and the second layer of piezoelectric elements. The assembly may further include a weighted planar member operatively coupled to the buoyant planar member to promote contact of the assembly with the water.

According to a second aspect, there is provided an assembly 7for generating energy from waves. The assembly includes a pair of spaced-apart buoyant planar members. The assembly includes an elastic planar member coupled to and extending between the buoyant planar members. The assembly includes a piezoelectric element coupled to and extending along the elastic planar member. In this example, the elastic planar member is pre-stressed in tension while the piezoelectric element is being bonded thereto in order to pre-compress the piezoelectric material so that the material is less prone to cracking at the tops and in the troughs of the steeper waves.

According to a third aspect, there is provided an assembly for generating energy from waves. The assembly includes a first plurality of longitudinally spaced-apart, elongate buoyant planar members. The assembly includes a second plurality of longitudinally spaced-apart, elongate buoyant planar members. The assembly includes a plurality of longitudinally spaced-apart elastic planar members with piezoelectric elements extending between the first and second plurality of buoyant planar members.

According to a fourth aspect, there is provided an assembly for generating energy from waves. The assembly includes at least one buoyant, planar member having a top, having a bottom, the top and the bottom being hexagonal in shape, and having first, second, third, fourth, fifth and sixth sides. The second side of the buoyant planar member is between the first side and the third side of the buoyant planar member. The fourth side of the buoyant planar member is between the third side and the fifth side of the buoyant planar member. The six side of the buoyant planar member is between the fifth side and the first side of the buoyant planar member. The assembly comprises a plurality of piezoelectric elements including a first said piezoelectric element coupled to and extending outwards from the first side of the buoyant planar member, a second said piezoelectric element coupled to and extending outwards from the third side of the buoyant planar member, and a third said piezoelectric element coupled to and extending outwards from the fifth side of the buoyant planar member.

According to a fifth aspect, there is provided an assembly for generating energy from waves. The assembly includes a plurality of buoyant planar members, each having a top, having a bottom, the top and the bottom being hexagonal, and having first, second, third, fourth, fifth and sixth sides.

The second side of the buoyant planar member is between the first side and the third side of the buoyant planar member. The fourth side of the buoyant planar member is between the third side and the fifth side of the buoyant planar member. The six side of the buoyant planar member is between the fifth side and the first side of the buoyant planar member. The assembly includes a plurality of elastic planar members. A first said elastic planar member couples to and extends between the third side of a first said buoyant planar member and the sixth side of a second said buoyant planar member. A second said elastic planar member couples to and extends between the fourth side of the second said buoyant planar member and the first side of a third said buoyant planar member. A third said elastic planar member couples to and extends between the fifth side of the third said buoyant planar member and the second side of a fourth said buoyant planar member. A fourth said elastic planar member couples to and extends between the sixth side of the fourth said buoyant planar member and the third side of a fifth said buoyant planar member. A fifth said elastic planar member couples to and extends between the first side of the fifth said buoyant planar member and the fourth side of a sixth said buoyant planar member. A sixth said elastic planar member couples to and extends between the second side of the sixth said buoyant planar member and the fifth side of the first said buoyant planar member. The assembly includes a plurality of piezoelectric elements. Each of the elastic planar members includes one or more said piezoelectric elements coupled thereto.

BRIEF DESCRIPTION OF DRAWINGS

The invention will be more readily understood from the following description of preferred embodiments thereof given, by way of example only, with reference to the accompanying drawings, in which:

FIG. 3 is a partial side elevation view of the assembly of FIG. 1;

FIG. 4 is an enlarged view of a section of the wave-interacting portion of the assembly shown in FIG. 3;

FIG. 13 is a simplified schematic top view of the overall electrical system of the assembly of FIG. 9, with one of the plurality of diode bridge circuits and piezoelectric elements of the assembly shown and the rest being removed;

FIG. 14 is a schematic, enlarged top view of the piezoelectric element and diode bridge of FIG. 13;

DESCRIPTION OF THE PREFERRED EMBODIMENTS

Figure 1:
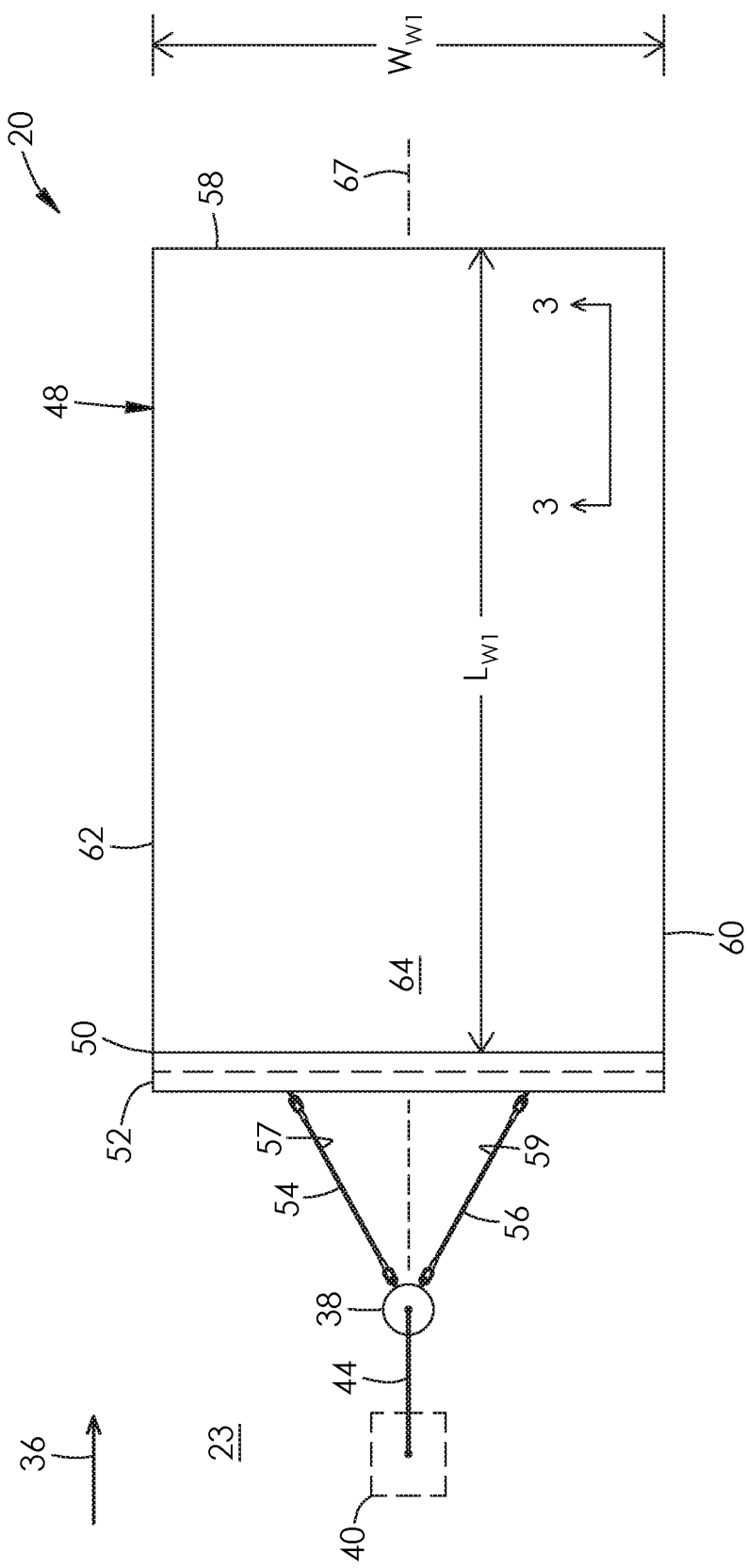
FIG. 1 is a top plan view of a floating piezoelectric assembly for generating energy from waves according to a first embodiment, showing the extent of the assembly in relation to the wave direction and seabed, and showing the manner in which the assembly is moored according to one example.
Figure 2:
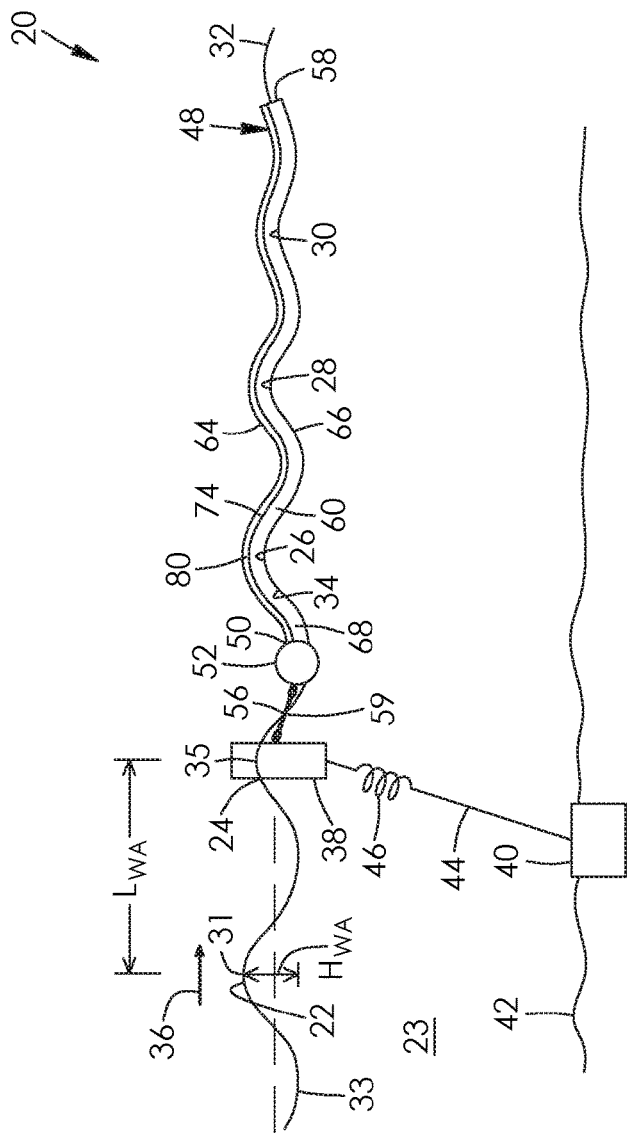
FIG. 2 is a left side elevation view of the assembly of FIG. 1.

Referring to the drawings and first to FIG. 1, there is shown a floating piezoelectric assembly 20 for generating energy from water waves 22, 24, 26, 28, 30 and 32 seen in FIG. 2 on a large body of water, in this example the ocean 23. However, this is not strictly required and the body of water may be a lake or sea in other examples, for example.

Each of the waves has a surface as shown by surface 34 for wave 26. Referring to FIG. 2, each wave has a wave height extending between its crest and trough, as shown by wave height Wu for wave 22 extending between its crest 31 and trough 33. The waves are spaced-apart at intervals from left to right from the perspective of FIGS. 1 and 2 and as shown by arrow of numeral 36. Each wave has a wavelength that extends between adjacent crests of waves, as seen by wavelength $L_{WA}$ extending between crests 31 and 35 of waves 22 and 24.

The assembly 20 includes in this example a buoy 38 floating at the surface 34 of the waves, in this case wave 24. The assembly includes an anchor 40 abutting the bottom of the body of the water, in this example ocean floor 42. The buoy couples to the anchor via an elongate member, in this example rope 44. The rope has an extendable portion, as shown schematically by the coiled portion 46, to accommodate the changing levels of the ocean caused by the waves and the tide.

Referring back to FIG. 1, the assembly 20 includes a wave-covering or interacting portion 48 that is generally planar and blanket-like in shape in this example. As seen in FIG. 2, the wave-interacting portion of the assembly 20 is shaped to extend across a plurality of the waves 26, 28, 30 and 32. The wave-interacting portion 48 of the assembly is thus shaped to lie in a direction extending over the waves. The wave-interacting portion 48 of the assembly 20 has a first or proximal end 50 positioned to receive on-coming waves, such as wave 24 seen in FIG. 2 moving in the direction shown by arrow of numeral 36. The assembly includes an elongate float 52 coupled to and extending along the proximal end of the wave-interacting portion 48 of the assembly. The float is cylindrical in shape in this example.

As seen in FIG. 1, the assembly 20 includes at least one and in this example a pair of connecting members, in this case tethers 54 and 56 that releasably tether the wave-interacting portion 48 of the assembly 20 to buoy 38. As seen in FIG. 2, the wave-interacting portion of the assembly is thus moored to the ocean floor 42 via tethers 56, buoy 38, rope 44 and anchor 40.

The wave-interacting portion 48 of the assembly 20 has a second or distal end 58 spaced-apart from the proximal end 50 thereof. The wave-interacting portion of the assembly has a length $L_{WI}$ that extends between the proximal and distal ends thereof, and which is configured to extend in line with the direction of the waves, as shown by arrow of numeral 36. As seen in FIG. 1, the wave-interacting portion of the assembly has a pair of spaced-apart sides 60 and 62 that extend between the proximal and distal ends thereof. The wave-interacting portion 48 of the assembly 20 has a width $W_{WI}$ that extends between the sides thereof. The wave-interacting portion 48 of the assembly 20 has a top 64 that generally faces upwards in this example when in use and, as seen in FIG. 2, a bottom 66 spaced-apart from the top. The top and bottom of the wave-interacting portion of the assembly are substantially similar in size, and rectangular in shape in this example when viewed from above or below, as seen in FIG. 1 by top 64.

Still referring to FIG. 1, the wave-interacting portion 48 of the assembly 20 has a longitudinal axis 67. The sides 60 and 62 of the wave-interacting portion extend longitudinally in parallel with longitudinal axis 67 and are longer than the ends 50 and 58 of the assembly in this example. The longitudinal axis of the wave-interacting portion 48 of the assembly 20 aligns with the direction of wave propagation, shown by arrow of numeral 36, when the assembly 20 is in use.

As seen in FIG. 3, the wave-interacting portion of the assembly includes a buoyant planar member 68 that is continuous and flexible. The term buoyant planar member as herein described may also be referred to as a float. The buoyant planar member extends from side 60 to side 62 of the wave-interacting portion 48 of the assembly 20 seen in FIG. 1 as well as between the ends 50 and 58 of the wave-interacting portion of the assembly in this example. Referring back to FIG. 4, the buoyant planar member 68 is made of closed cell foam material in this example, in this case ETHAFOAM®: a flexible closed cell polyethylene foam product that may be purchased at Sealed Air Corporation, having an address of 8215 Forest Point Boulevard, Charlotte, N.C., 28273, USA. However, this is not strictly required and the buoyant planar member may be made of other buoyant, flexible materials in other examples.

The buoyant planar member 68 is generally sheet-like in shape and has a top 70 and bottom 72 contiguous with the top 64 and bottom 66 of the assembly 20 seen in FIG. 3. Referring to FIG. 2, the buoyant planar member is rectangular in top and bottom profile in this example when viewed from above and below, is shaped to float along the surface 34 of the ocean waves 26, 28, 30 and 32, and may be at least partially submerged. The buoyant planar member 68 may be referred to as a planar, lower layer of the assembly made of buoyant material.

Figure 5:
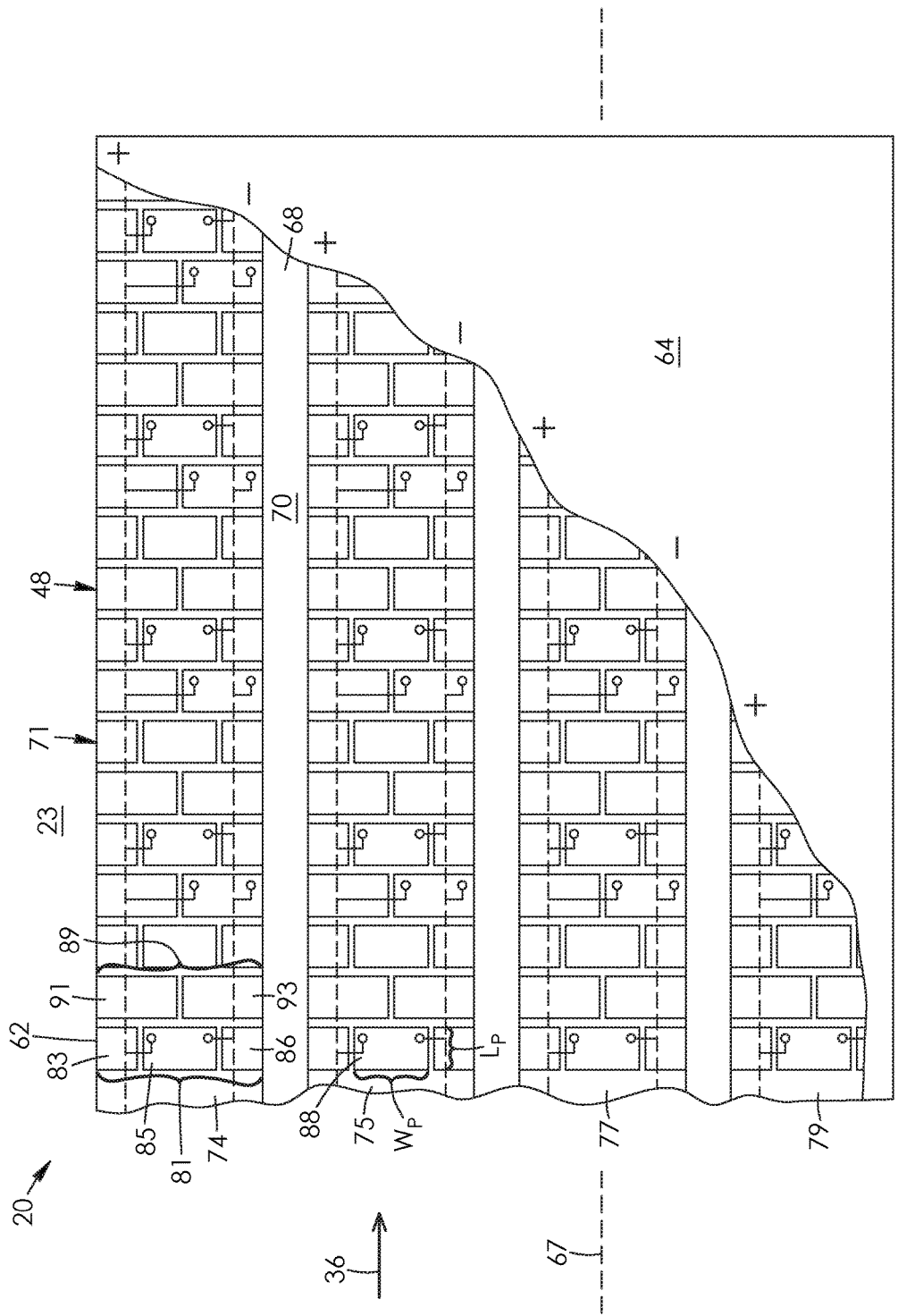
FIG. 5 is a fragmented, top plan view of the assembly of FIG. 1, with the weighted top planar member thereof being partially removed to reveal a typical layout of the piezoelectric elements of the assembly on the top of a plurality of longitudinally-extending and spaced-apart elastic planar members of the assembly.

As seen in FIG. 5, the assembly 20 generally includes a plurality of spaced-apart, longitudinally-extending elastic planar members 74, 75, 77 and 79 in this example. The elastic planar members are generally rectangular sheets in shape in this example. The elastic planar members 74, 75, 77 and 79 in this case are thus made of rectangular strips oriented in the direction of the waves, as shown by arrow of numeral 36, in order to make manufacturing easier and to accommodate wave irregularities. However, the plurality of elastic planar members 74, 75, 77 and 79 is not strictly required, as the assembly 20 may include only a single, wide elastic planar member in other embodiments, for example.

The elastic planar members extend along and operatively couple with the buoyant planar member, as seen in FIG. 4 by elastic planar member 74 coupling to buoyant planar member 68. The elastic planar members in this example are made of carbon fibre composite, in this case a carbon fibre reinforced plastic which provides high strength and corrosion resistance. However, this is not strictly required and the elastic planar members may be made of other materials in other examples such as a spring steel sheet, for example.

Still referring to FIG. 4, each elastic planar member 74 has a bottom 76 and a top 78 and is generally rectangular in top and bottom profile in this example when viewed from above. The elastic planar members may be referred to as a planar elastic layer of the assembly. As seen in FIG. 3, the buoyant planar member 68 is thicker than the elastic planar members 74 in this example and is flexible enough to take up the shape of the wave and transfer this shape to the elastic planar members. The buoyant planar member must also be incompressible enough to prevent excess squeezing by the motion of the waves which may prevent the true shape of the waves being transferred continuously to the flexing elastic planar members.

The assembly 20 in this example further includes a flexible, weighted planar member 80 that extends along, operatively couples to and in this example is contiguous with the elastic planar member. However, the weighted planar member may not be strictly required in other embodiments. The weighted planar member 80 in this example is made of closed cell foam containing particles of a heavy material. Alternatively, the weighted planar member may be made of other suitable materials in other examples. As seen in FIG. 4, the weighted planar member 80 has a bottom 82, and a top 84 which may be exposed to the air above the waves 28. The weighted planar member is generally rectangular in top and bottom profiles when viewed from above or below in this example. The weighted planar member 80 may be referred to as an upper layer of the assembly 20 made of weighted material. The elastic planar members 74 couple to and are between the buoyant planar member 68 and the weighted planar member in this example. Referring to FIG. 3, the weighted planar member 80 is configured to add sufficient weight to the assembly 20 to ensure that the whole of the wave-interacting assembly 48 conforms with the waves 26 and 28 as they pass underneath the weighted planar member.

As seen in FIG. 5, the assembly 20 includes a first plurality of piezoelectric elements per each of the elastic planar members 74, 75, 77 and 79, in this example a first, planar, upper layer 71 of longitudinally spaced-apart rows of piezoelectric elements relative to longitudinal axis 67. This is shown for elastic planar member 74 by a first row 81 of spaced-apart elements 83, 85 and 86, and a second row 89 of spaced-apart elements 91 and 93 that are staggered relative to the elements of the first row. Each row has between two to three piezoelectric elements in this example; however, this is not strictly required. As seen in FIG. 4, the first layer 71 of piezoelectric elements is strongly coupled to the top 78 of its elastic planar member 74 of the assembly and is below the bottom 82 of the weighted planar member 80 of the assembly.

Referring to FIG. 3, the assembly 20 includes a second plurality of piezoelectric elements for each elastic planar member, in this example a second, planar, lower layer 73 of longitudinally spaced-apart rows of piezoelectric elements, as shown by rows 95 and 97 of elements 88 and 90 in FIG. 3, with the rows of layer 73 being spaced-apart from and staggered relative to the first layer 71 of piezoelectric elements 86. The second layer of piezoelectric elements is arranged in a substantially similar manner to the first layer seen in FIG. 5 and therefore will not be described in detail.

The wave-interacting portion 48 of the assembly 20 may have a reduced beam stiffness at the gap between the piezoelectric elements, as shown in FIG. 3 by the gap 92 between elements 88 and 90. This effect is minimized by staggering the rows 81 and 89 of elements 86 and 93 of the first layer 71 of piezoelectric elements above the elastic planar members 74 relative to the rows 95 and 97 of elements 88 and 90 of the second layer 73 of piezoelectric elements below the elastic planar member.

Figure 6:
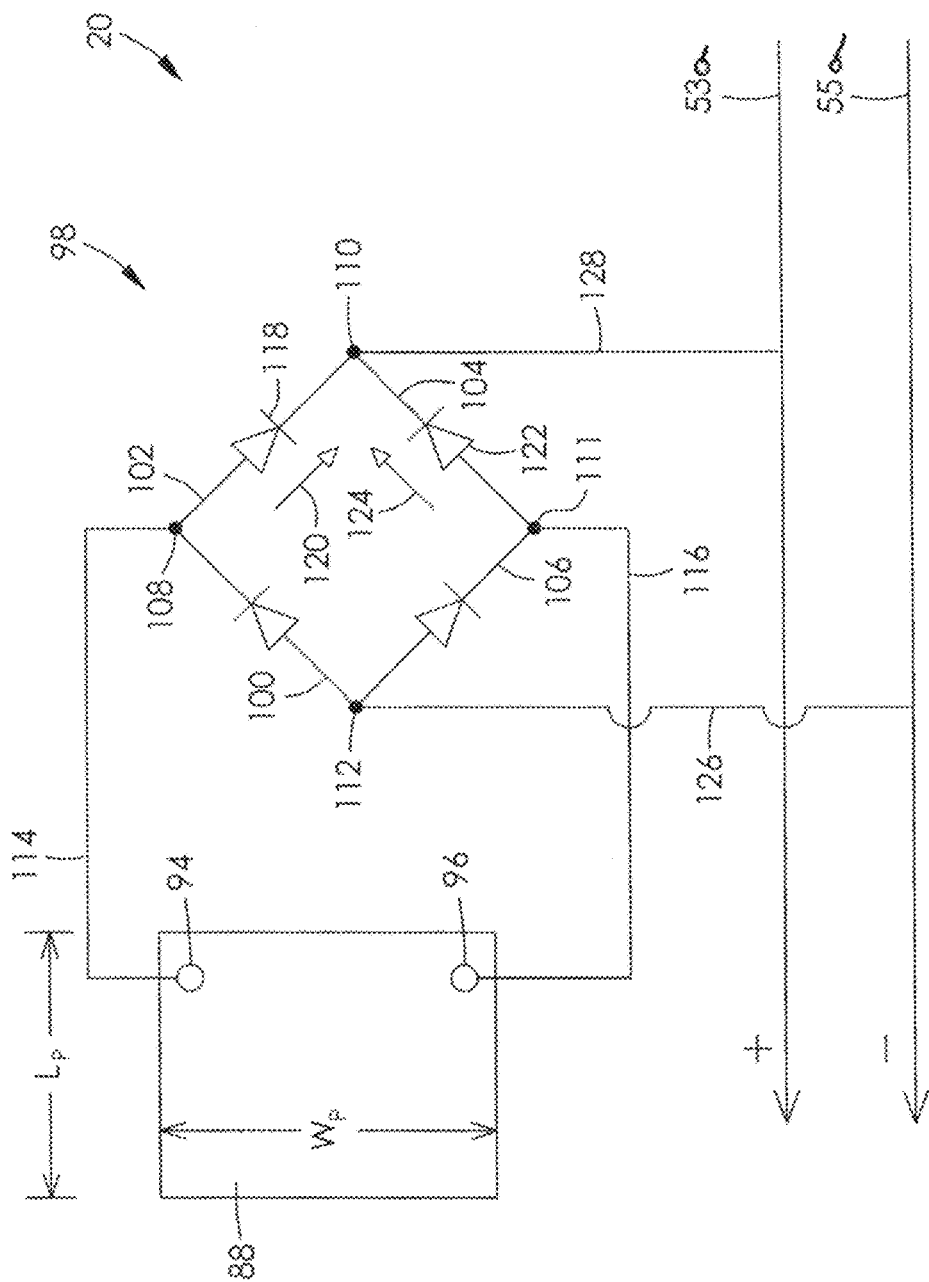
FIG. 6 is a schematic view of one of the piezoelectric elements of the assembly of FIG. 3, together with a diode bridge circuit of the assembly electrically coupled thereto.

As seen in FIG. 6, each of the piezoelectric elements 88 includes a length $L_P$ and a width $W_P$. Referring to FIG. 5, the length of the piezoelectric element 88 is understood to be measured in the direction the waves are travelling, as shown by arrow of numeral 36, even if this length is shorter than the width of the piezoelectric element measured in the perpendicular direction of the wave crests.

As seen in FIG. 4, the second layer 73 of piezoelectric elements 88 is strongly coupled to the bottom 76 of the elastic planar members 74 of the assembly and extends downwards, from the perspective of FIG. 4, to the top 70 of the buoyant planar member 68 of the assembly. The first layer 71 of piezoelectric elements 86, the second layer 73 of piezoelectric elements 88 and the elastic planar member 74 are therefore between the buoyant planar member 68 and the weighted planar member 80 in this embodiment.

The elastic planar members 74 are also thus between the first layer of piezoelectric elements and the second layer of piezoelectric elements. The piezoelectric elements 86 and 88 comprise, in this example, thin top and bottom layers of material laminated to the elastic planar member 74 and which together form an elastic beam that is sufficiently flexible to conform with the waves 26 and 28. Typically each elastic planar member may be 90% or more of the total thickness comprising the sum of the thicknesses of the elastic planar member and piezoelectric elements. This may function to reduce the cost of the piezoelectric elements and the weight of the piezo/elastic planar laminate if the elastic planar members are made of carbon fiber, which is about five times lighter than the piezoelectric elements.

Referring to FIG. 3, the piezoelectric elements 86, 88, 90 and 93 are generally rectangular prisms in shape in this example with lengths $L_P$ that generally extend in the direction of the wavelengths $L_{WA}$ of the waves 26 and 28 when the piezoelectric elements align with the crests 35 of the waves. The length of each piezoelectric element is shaped to be shorter than about one quarter of the length of the smallest wavelength $L_{WA}$ of a range of waves on which the assembly 20 is designed to operate in one example. Piezoelectric elements so shaped may inhibit the elements from being stretched at one end while being compressed at the other end, the result of which would be to reduce or to nullify the piezoelectric output.

Each of the piezoelectric elements 86, 88, 90 and 93 is made of piezo-ceramic material that is reinforced or pre-stressed by coupling or bonding the material to a pre-stressed elastic substrate made of metal or carbon fibre, for example. Pre-stressing the elastic planar member 74 by bonding the piezoelectric elements thereto while the elastic planar member is under tension subjects the piezoelectric elements to compression. This can ensure that, during operation, the brittle piezo-ceramic material is subjected only to compression in order to inhibited cracking thereof. The elastic planar member 74 is pre-stressed in tension while the piezoelectric elements are being bonded thereto in order to pre-compress the piezoelectric material so that the material is less prone to cracking at the tops and in the troughs of the steeper waves in this example. Accordingly, the piezoelectric elements as herein described are configured to promote a state of compressive stress therein.

Each of the piezoelectric elements described herein is made of piezoelectric material. In this example, the above referred-to piezo-ceramic material is modified lead zirconate titanate (PZT). The piezoelectric elements may be purchased under the trade name "Soft PZT PIC181" at PI Ceramic GmbH, having an address of Lindenstrasse 07589, Lederhose, Germany. More details regarding PIC181 may be found in the catalogue entitled "*Catalog: PI Piezoelectric Ceramic Products* Fundamentals, Characteristics and Applications", which has a catalog number of CAT125E, which is accessible via http://www.piceramic.com/products/piezo-electric-materials.html, and which is incorporated herein by reference. The material can manifest a high coupling coefficient and may therefore produce a high electrical output for a given input of mechanical (elastic) energy, such as about 46%, for example. However, the above specific type of piezoelectric element is not strictly required and the piezoelectric elements may be made of other materials in other examples and purchased from other manufacturers. For example, other suitable piezoelectric elements may be obtained from American Piezo, APC International, Ltd., which has an address of PO Box 180 Mackeyville, Pa. 17750 USA.

Referring to FIG. 6, the assembly 20 includes a plurality of electrical circuits, in this example diode bridge circuits for each of its piezoelectric elements, as shown by diode bridge circuit 98 for piezoelectric element 88. The bridge circuit includes a rectangular arrangement of conductors 100, 102, 104 and 106. Conductors 100 and 102 couple together at terminal 108, conductors 102 and 104 couple together at terminal 110, conductors 104 and 106 couple together at terminal 111 and conductors 106 and 100 couple together at terminal 112.

Each piezoelectric element 88 includes a pair of spaced-apart electrical contacts 94 and 96. Contact 94 of the piezoelectric element couples to terminal 108 via a conductor, in this example wire 114 and contact 96 of the piezoelectric element couples to terminal 111 via a conductor, in this example wire 116. The diode bridge circuit 98 includes a first diode 118 configured to allow the flow of current along conductor 102 in the direction extending from terminal 108 to terminal 110, as shown by arrow of numeral 120. The diode bridge circuit includes a second diode 122 configured to allow the flow of current along conductor 104 in the direction extending from terminal 111 to terminal 110, as shown by arrow of numeral 124. The assembly 20 further includes a pair of conductors, in this example wires 126 and 128. Wire 126 electrically couples terminal 112 to a negative DC bus 55a of the assembly 20 that is connected to a cable 59 that passes along tether 56 to the buoy 38 seen in FIG. 7. Referring back to FIG. 6, wire 128 electrically couples terminal 110 to a positive DC bus 53a of the assembly 20 that is connected to a cable 57 that passes along tether 54 to the buoy 38 seen in FIG. 7. Each piezoelectric element 88 is thus connected through its diode bridge circuit 98 to positive and negative DC busses 53a and 55a that collect the current that constitutes the electrical output of the assembly 20. Each of the diode bridge circuits 98 thus electrically couples to a respective one of the piezoelectric elements 88.

Figure 7:
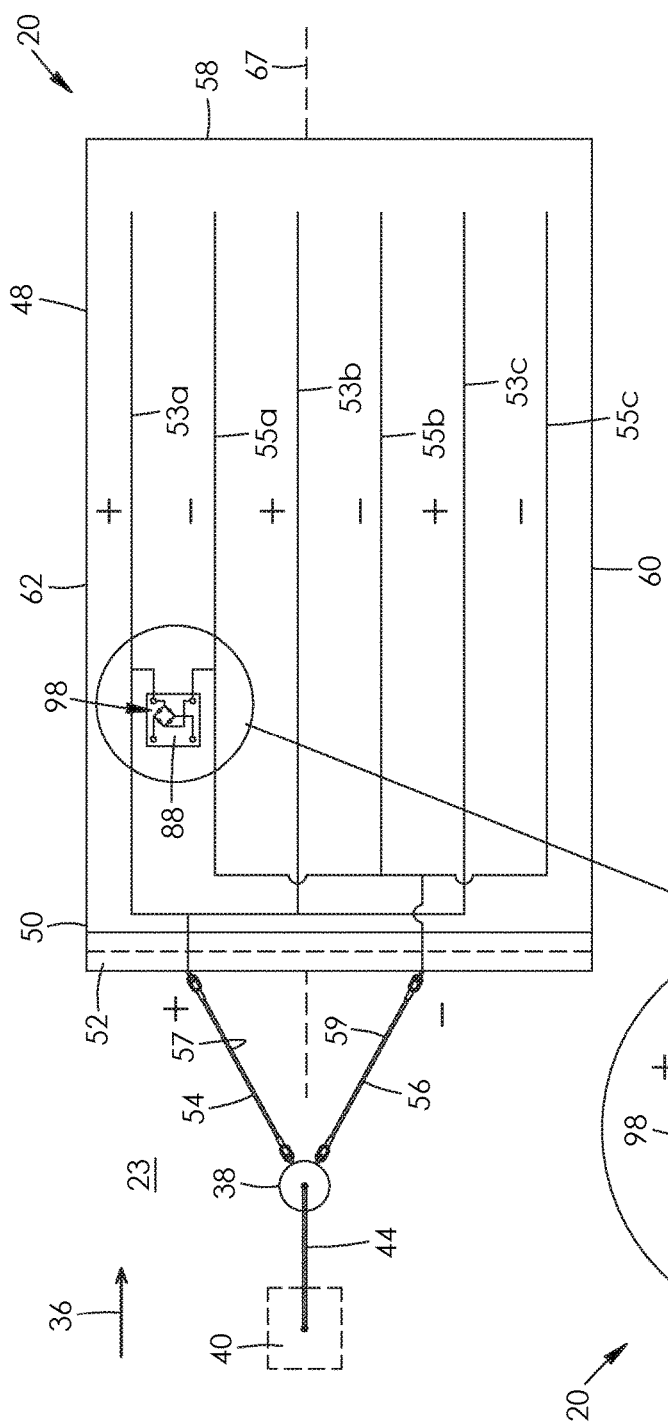
FIG. 7 is a simplified schematic top view of the overall electrical system of the assembly of FIG. 1, with one of the plurality of diode bridge circuits and piezoelectric elements of the assembly shown and the rest being removed.
Figure 8:
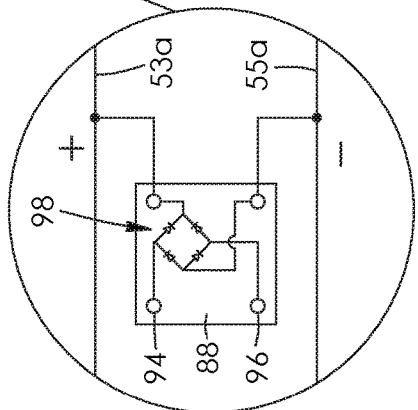
FIG. 8 is a schematic, enlarged top view of the piezoelectric element and diode bridge of FIG. 7.

As seen in FIG. 7, the assembly 20 includes a plurality of longitudinally-extending and spaced-apart positive DC busses 53a, 53b and 53c which are electrically coupled together and to cable 57 that passes along tether 54. The assembly includes a plurality of longitudinally-extending and spaced-apart negative DC busses 55a, 55b and 55c interposed between the positive DC busses. DC busses 55a, 55b and 55c are electrically coupled together and to cable 59 that passes along tether 56. The piezoelectric elements are interposed between and electrically coupled to respective ones of the negative and positive busses, as shown by piezoelectric element 88 positioned between and electrically coupled to busses 53a and 55a.

In operation and referring to FIG. 3, the assembly 20 generates electric energy by alternately stretching and compressing the piezoelectric elements 86, 88, 90 and 93 as the laminated elastic beam made of the elastic planar member 74 and the piezoelectric elements is bent by the action of successive waves 26 and 28. As seen in FIG. 7, the tethers 54 and 56 carry electrical cables 57 and 59 connected via DC busses 53a, 53b and 53c, and 55a, 55b and 55c, respectively, to the diode bridge circuits 98 such that when waves moving in the direction of arrow 36 pass under the assembly 20, the piezoelectric elements 86, 88, 90 and 93 seen in FIG. 3 are caused to deform alternately in compression and then tension. Electric energy is generated thereby. Referring to FIG. 7, the electric energy passes through the cables 57 and 59 supported by tethers 54 and 56. As this energy is being extracted from the waves, the assembly 20 may further function thereby to reduce the height of the waves $H_{WA}$ passing therethrough and may thus provide a wave calming effect. This is shown in FIG. 2 by the height of wave 32 exiting away from the assembly 20 being less than that of wave 22 approaching but not yet in contact with the assembly.

Assembly 20 set out in FIGS. 1 to 8 may be most cost effective for small systems where relatively small amounts of energy and a wave calming effect are needed.

For optimum performance, the piezoelectric elements as herein described should be stretched in the direction they are polarized, as shown by arrows of letter P in FIG. 4, with an intense magnetic field beforehand. This may produce four times as much energy as stretching the piezoelectric elements across the polarised direction which is the normal mode in which they are used. Put another way, the piezoelectric elements in this example should be polarised along their length $L_P$ as shown in FIG. 6 rather than in the direction of their width $W_P$ or thickness.

FIGS. 9 to 14 show an assembly 20.1 for generating electricity from waves according to a second aspect. Like parts have like numbers and functions as the assembly 20 shown in FIGS. 1 to 8 with the addition of decimal extension "0.1".

Figure 11:
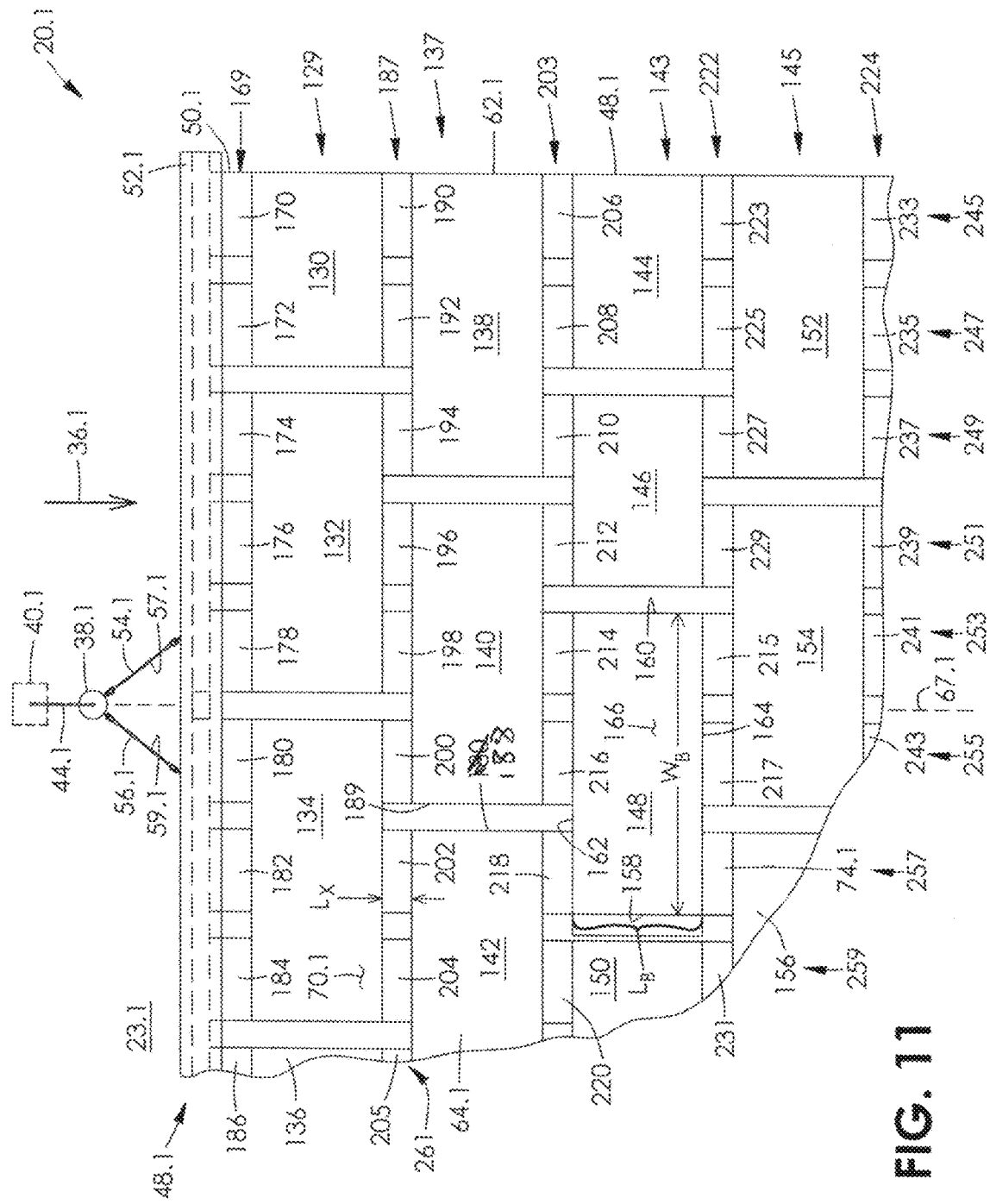
FIG. 11 is a top plan view of the assembly of FIG. 9, the assembly being shown partially in fragment.
Figure 12:
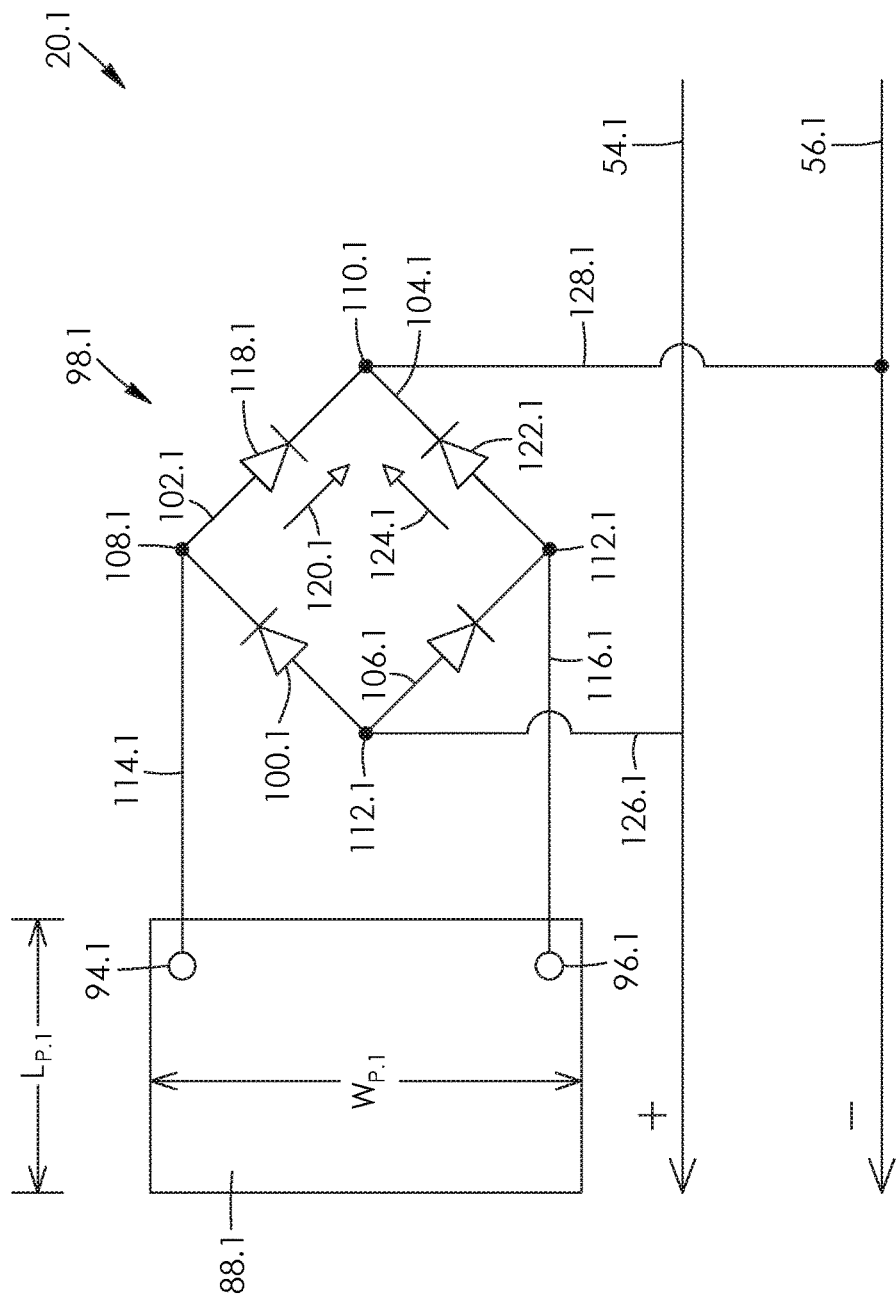
FIG. 12 is a schematic view of one of the piezoelectric elements of the assembly of FIG. 9, together with a diode bridge circuit of the assembly electrically coupled thereto.

As seen in FIG. 11, assembly 20.1 includes a plurality of longitudinally spaced-apart rows of elongate, laterally spaced-apart buoyant planar members, including: a first row 129 of laterally spaced-apart, elongate buoyant planar members 130, 132, 134 and 136, a second row 137 of laterally spaced-apart, elongate buoyant planar members 138, 140 and 142, which are staggered relative to buoyant planar members 130, 132, 134 and 136 of the first row 129, a third row 143 of laterally spaced-apart, elongate buoyant planar members 144, 146, 148 and 150 which are staggered relative to buoyant planar members 138, 140 and 142 of the second row 137, and a fourth row 145 of laterally spaced-apart, elongate buoyant planar members 152, 154 and 156 which are staggered relative to buoyant planar members 144, 146, 148 and 150 of the third row 143 and which align in this example with buoyant planar members 138, 140 and 142 of the second row 137. The buoyant planar members are planar and generally rectangular prisms in shape in this example.

Each buoyant planar member has a pair of spaced-apart outer first and second ends and a pair of spaced-apart sides extending between the ends, as shown by sides 158 and 160 and ends 162 and 164 of buoyant planar member 148. The sides of the buoyant planar members extend in parallel with longitudinal axis 67.1 of the wave-interacting portion 48.1 of the assembly 20.1 in this example. The ends 162 and 164 of the buoyant planar members 148 are longer than the sides 158 and 160 of the buoyant planar members in this example.

Figure 10A:
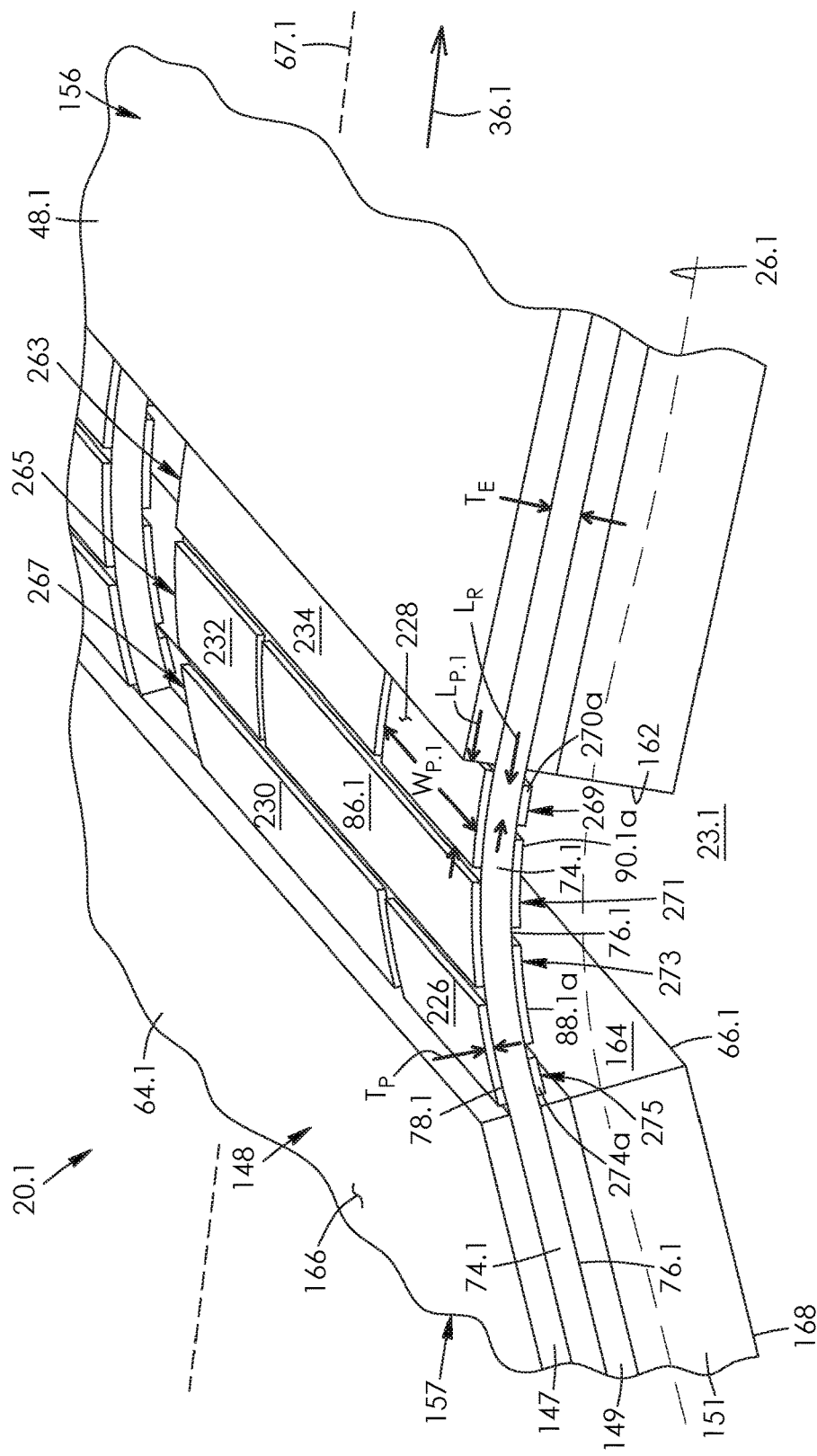
FIG. 10A is an enlarged top, side perspective view of a pair of the buoyant planar members of the assembly of FIG. 9 shown in fragment and coupled together with two of the elastic planar members of FIG. 11 one of which is shown in fragment, with a plurality of piezoelectric elements extending along and coupling to the tops and bottoms of the elastic planar members.
Figure 10B:
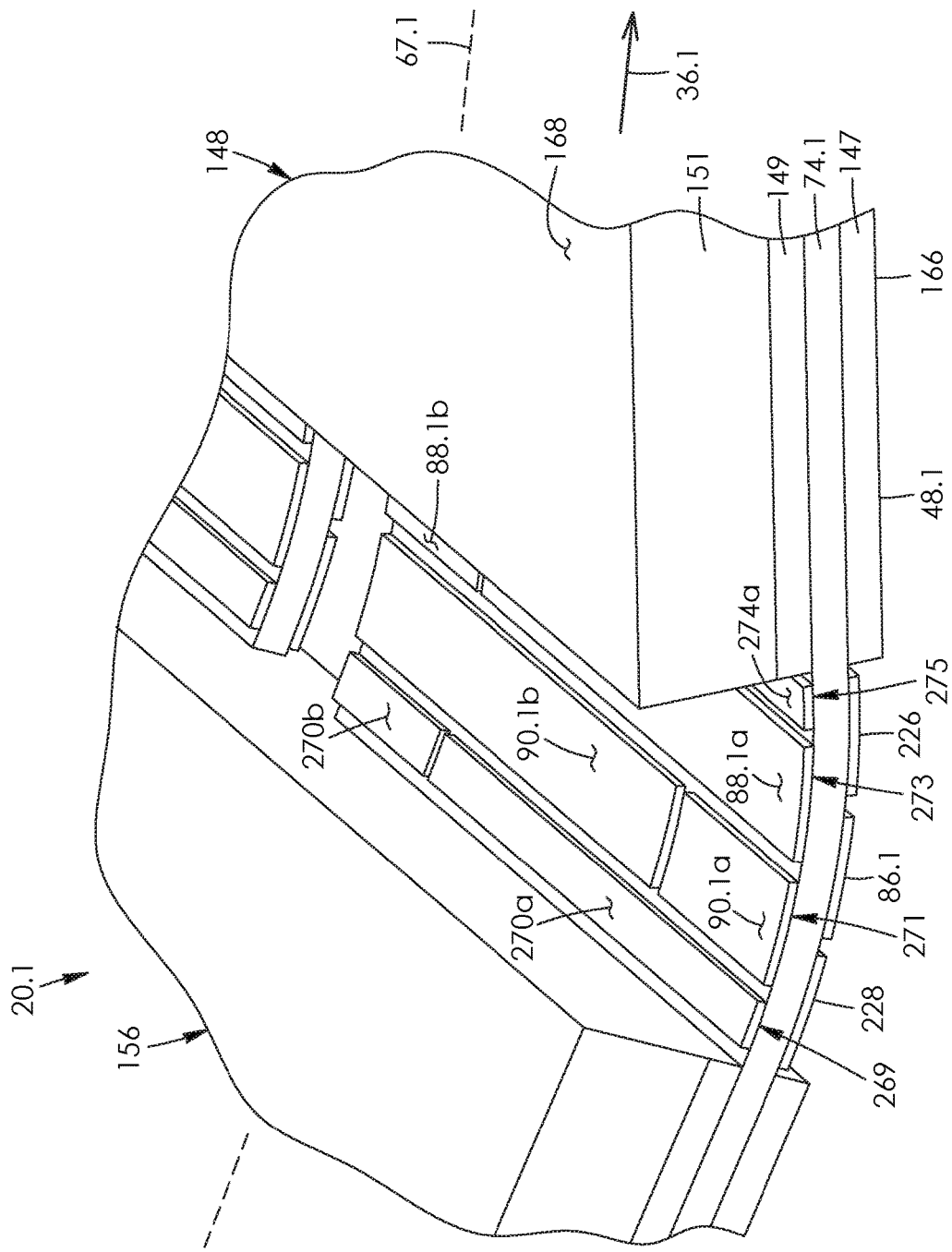
FIG. 10B is an enlarged bottom, side perspective view of the pair of the buoyant planar members of the assembly of FIG. 10A shown in fragment and coupled together with two of the elastic planar members of FIG. 11 one of which is shown in fragment, with a plurality of piezoelectric elements extending along and coupling to the tops and bottoms of the elastic planar members.

Each buoyant planar member 148 includes a planar top 166 and a planar bottom 168, seen in FIGS. 10A and 10B. The top and bottom of each buoyant planar member is substantially the same in size and rectangular in this example. Referring to FIG. 11, each buoyant planar member 148 has a width $W_B$ that extends between its ends 162 and 164 and a length LB that extends between its sides 162 and 164. The lengths of the buoyant planar members are selected to be small, with the lengths being at least four or five times less than the wavelength of the smallest wave from which the assembly 20.1 is being designed to extract power.

As seen in FIG. 11, assembly 20.1 includes a plurality of longitudinally spaced-apart rows of laterally spaced-apart elastic planar members, including a first row 169 of laterally spaced-apart elastic planar members 170, 172, 174, 176, 178, 180, 182, 184 and 186. Elastic planar members 170 and 172 couple to and extend between buoyant planar member 130 and float 52.1. Elastic planar members 174, 176 and 178 couple to and extend between buoyant planar member 132 and the float. Elastic planar members 180, 182 and 184 couple to and extend between buoyant planar member 134 and float 52.1. Elastic planar member 186 couples to and extends between buoyant planar member 136 and the float.

The plurality of longitudinally spaced-apart rows of laterally spaced-apart elastic planar members includes a second row 187 of laterally spaced-apart elastic planar members 190, 192, 194, 196, 198, 200, 202, 204 and 205. Elastic planar members 190 and 192 couple to and extend between buoyant planar members 130 and 138. Elastic planar member 194 couples to and extends between buoyant planar members 132 and 138. Elastic planar members 196 and 198 couple to and extend between buoyant planar members 132 and 140. Elastic planar member 200 couples to and extends between buoyant planar members 134 and 140. Elastic planar members 202 and 204 couple to and extend between buoyant planar members 134 and 142 in this example. Elastic planar member 205 couples to and extends between buoyant planar member 136 and 142 in this example.

The plurality of longitudinally spaced-apart rows of laterally spaced-apart elastic planar members includes a third row 203 of laterally spaced-apart elastic planar members 206, 208, 210, 212, 214, 216, 218 and 220. Elastic planar members 206 and 208 couple to and extend between buoyant planar members 138 and 144. Elastic planar member 210 couples to and extends between buoyant planar members 138 and 146.

Elastic planar member 212 couples to and extends between buoyant planar members 140 and 146. Elastic planar members 214 and 216 couple to and extend between buoyant planar members 140 and 148. Elastic planar member 218 couples to and extends between buoyant planar members 142 and 148. Elastic planar member 220 couples to and extends between buoyant planar members 142 and 150 in this example.

The plurality of longitudinally spaced-apart rows of laterally spaced-apart elastic planar members includes a fourth row 222 of laterally spaced-apart elastic planar members, 223, 225, 227, 229, 215, 217, 74.1, and 231. Elastic planar members 223 and 225 couple to and extend between buoyant planar members 144 and 152. Elastic planar member 227 couples to and extends between buoyant planar members 146 and 152.

Elastic planar member 229 couples to and extends between buoyant planar members 146 and 154. Elastic planar members 215 and 217 couple to and extend between buoyant planar members 148 and 154. Elastic planar member 74.1 couples to and extends between buoyant planar members 148 and 156. Elastic planar member 231 couples to and extends between buoyant planar members 150 and 156.

The plurality of longitudinally spaced-apart rows of laterally spaced-apart elastic planar members includes a fifth row 224 of longitudinally spaced-apart elastic planar members 233, 235, 237, 239, 241 and 243. Elastic planar members 233, 235 and 237 couple to and extend from buoyant planar member 152 to other buoyant planar members (not shown) of the assembly 20 and elastic planar members 239, 241 and 243 couple to and extend from buoyant planar member 154 to other buoyant planar members (not shown) of the assembly in a like pattern as described above. The term row as herein used is intended for arrangements of object which align perpendicular to the longitudinal axis 67.1 of the assembly 20.1.

The buoyant planar members are staggered relative to each other such that second side 188 of a buoyant planar member 142 adjacent to buoyant planar member 148 aligns part way between the sides 158 and 160 of buoyant planar member 148. First side 189 of a further buoyant planar member 140, adjacent to buoyant planar member 148, aligns part way between the sides 158 and 160 of buoyant planar member 148. At least one elastic planar member links together buoyant planar members from adjacent rows of buoyant planar members, as seen by elastic planar member 218 coupling together buoyant planar members 142 and 148 of rows 137 and 143 of buoyant planar members, and elastic planar members 214 and 216 coupling together buoyant planar members 140 and 148 of rows 137 and 143.

In this example and referring to FIG. 11, each buoyant planar member 148 has a first pair of elastic planar members 218 and 74.1 coupled to the ends 162 and 164 thereof and which are adjacent to the first side 158 of the buoyant planar member. Each buoyant planar member 148 has a second pair of elastic planar members 214 and 215 coupled to the ends 162 and 164 thereof and which are adjacent to the second side 160 of the buoyant planar member. Some buoyant planar members further include a third pair of elastic planar members 216 and 217 coupled to the ends 162 and 164 thereof and which are between the first side 158 and second side 160 of the buoyant planar member. Thus, each of the buoyant planar members includes at least four of the elastic planar members in this example.

Each buoyant planar member thus spans two or more elastic planar members, as shown by buoyant planar member 148 spanning elastic planar members 214, 216 and 218. By using numerous elastic planar members in the assembly 20.1 and staggering the buoyant planar members as shown in FIG. 11, some lateral pliability results that should enable the assembly to withstand variations in wave heights and directions within the array.

The elastic planar members align in a plurality of longitudinally-extending, laterally-spaced-apart columns including: a first column 245 of elastic planar members 170, 190, 206, 223 and 233; a second column 247 of elastic planar members 172, 192, 208, 225 and 235; a third column 249 of elastic planar members 174, 194, 210, 227 and 237; a fourth column 251 of elastic planar members 176, 196, 212, 229 and 239; a fifth column 253 of elastic planar members 178, 198, 214, 215, 241; a sixth column 255 of elastic planar members 180, 200, 216, 217 and 243; a seventh column 257 of elastic planar members 182, 202, 218 and 74.1; an eighth column 259 of elastic planar members 184, 204, 220 and 231; and a ninth column 261 of elastic planar members 186 and 205. The term column as herein used is intended for arrangements of object which align in parallel with the longitudinal axis 67.1 of the assembly 20.1.

As seen in FIG. 10A, the elastic planar members 74.1, made of carbon fibre composite in this example, may extend through their paired buoyant planar members 148 and 156 but are only subject to bending between respective ones of the buoyant planar members as waves propagate 36.1 through the assembly 20.1.

In this example, each of the buoyant planar members 148 and 156 includes a top portion 157 in this example made of two thick wooden slabs, between which the elastic planar members are clamped, with a thicker layer of light floating material underneath coupled to the lower slab. This is shown by slabs 147 and 149 for member 148, with a bottom portion 151 thereof made of a floating material underneath and coupled to slab 149. Thus, the elastic planar members couple to and extend between the top portions of the buoyant planar members in this example. However, this is not strictly required and the buoyant planar members and elastic planar members may be made of other materials in other examples and the buoyant planar members may be constructed in other ways such as with a lighter box structure illustrated in FIG. 15 for the buoyant planar member 148.2 of the third aspect. Also, the elastic planar members do not have to be continuous but could be made of shorter lengths sufficient only to include the length of the beam, with sufficient extra length to allow the members to be clamped to two buoyant planar members at their ends. Significant cost reduction may then accrue because less carbon fibre would be needed in this case.

As seen in FIG. 10A, assembly 20.1 includes a plurality of piezoelectric elements coupled to and extending outwards from the buoyant planar members, including a plurality of longitudinally spaced-apart upper rows of laterally spaced-apart piezoelectric elements coupled to and extending along the tops 78.1 of the elastic planar members 74.1 at locations between adjacent buoyant planar members 148 and 156. This includes a first upper row 263 of laterally spaced-apart piezoelectric elements 228 and 234, a second upper row 265 of laterally spaced-apart piezoelectric elements 86.1 and 232 and a third upper row 267 of laterally spaced-apart piezoelectric elements 226 and 230. In this example, the first upper row 263 of piezoelectric elements 228 and 234 are positioned adjacent to buoyant planar member 156, the second upper row 265 of piezoelectric elements 86.1 and 232 are positioned between buoyant planar members 148 and 156, and the third upper row 267 of piezoelectric elements 226 and 230 are positioned adjacent to buoyant planar member 148.

The piezoelectric elements 228 and 234 of the first upper row 263 thereof are staggered relative to at least one of the piezoelectric elements of the second upper row 265 thereof, in this example piezoelectric element 86.1. The piezoelectric elements 226 and 230 of the third row 267 thereof longitudinally align with respective ones of the piezoelectric elements 228 and 234 of the first row 263 thereof. The piezoelectric elements 226 and 230 of the third row 267 thereof are staggered relative to at least one of the piezoelectric elements of the second upper row 265 thereof, in this example piezoelectric element 86.1.

As seen in FIG. 10B, the assembly 20.1 includes a plurality of longitudinally spaced-apart lower rows of laterally spaced-apart piezoelectric elements coupled to and extending along the bottoms 76.1 of the elastic planar members 74.1 at locations between adjacent buoyant planar members 148 and 156. This includes a first lower row 269 of laterally spaced-apart piezoelectric elements 270a and 270b, a second lower row 271 of laterally spaced-apart piezoelectric elements 90.1a and 90.1b, a third lower row 273 of laterally spaced-apart piezoelectric elements 88.1a and 88.1b, and a fourth lower row 275 of laterally spaced-apart piezoelectric elements 274a. In this example, the first lower row 269 of piezoelectric elements 270a and 270b are positioned adjacent to buoyant planar member 156, the second lower row 271 of piezoelectric elements 90.1a and 90.1b are positioned between buoyant planar members 148 and 156, the third lower row 273 of piezoelectric elements 88.1a and 88.1b are positioned buoyant planar members 148 and 156, and the fourth lower row 275 of piezoelectric elements 274a is positioned adjacent to buoyant planar member 148.

Each of the lower rows of piezoelectric elements comprises a pair of piezoelectric elements in this example, with at least one of the piezoelectric elements from a given lower row being staggered relative to the pair of piezoelectric elements from an adjacent one of lower rows, as was described for the upper row of piezoelectric elements above. Thus, at least one of the piezoelectric elements 270a from the first lower row 269 is staggered relative to the pair of piezoelectric elements 90.1a and 90.1b from the second lower row 271, at least one of the piezoelectric elements 90.1b from the second lower row 271 is staggered relative to the pair of piezoelectric elements 88.1a and 88.1b from the third lower row 273, and at least one of the piezoelectric elements 274a from the fourth lower row 275 is staggered relative to the pair of piezoelectric elements 88.1a and 88.1b from the third lower row 273.

As seen in FIG. 10B, the piezoelectric elements 270a and 270b of the first lower row and fourth lower row are smaller than and, in this example, have lengths $L_R$ that less than half than, and in this example 2.5 times smaller than the lengths $L_P.1$ of the piezoelectric elements 228 of the rest of the upper and lower rows of piezoelectric elements.

Referring to FIG. 10A, each of the upper rows of piezoelectric elements spans between and overlaps above a vertically-aligned pair of the lower rows of piezoelectric elements in this example. This is shown by upper row 263 of piezoelectric elements 228 and 234 extending between lower rows 269 and 271 of piezoelectric elements 270a and 90.1a.

The piezoelectric elements of the upper rows thereof are staggered relative to a vertically-aligned piezoelectric elements of the lower rows of piezoelectric elements in this example. This is shown by piezoelectric elements 228 and 234 of the upper row 263 being staggered relative to vertically-aligned piezoelectric elements 270a and 90.1a of the lower rows 269 and 271. The upper rows of piezoelectric elements are thus longitudinally staggered relative to the lower rows of piezoelectric elements in this embodiment.

The use of rigid buoyant planar members 148 and 156 in this embodiment will enable the length of the flexing elastic planar members to be reduced along with the cost of the relatively expensive piezoelectric elements bonded above and below the elastic planar members compared to their cost for assembly 20. Assembly 20.1 may thus be more suitable for larger scale energy generation where costs of construction have to be minimised.

Figure 15:
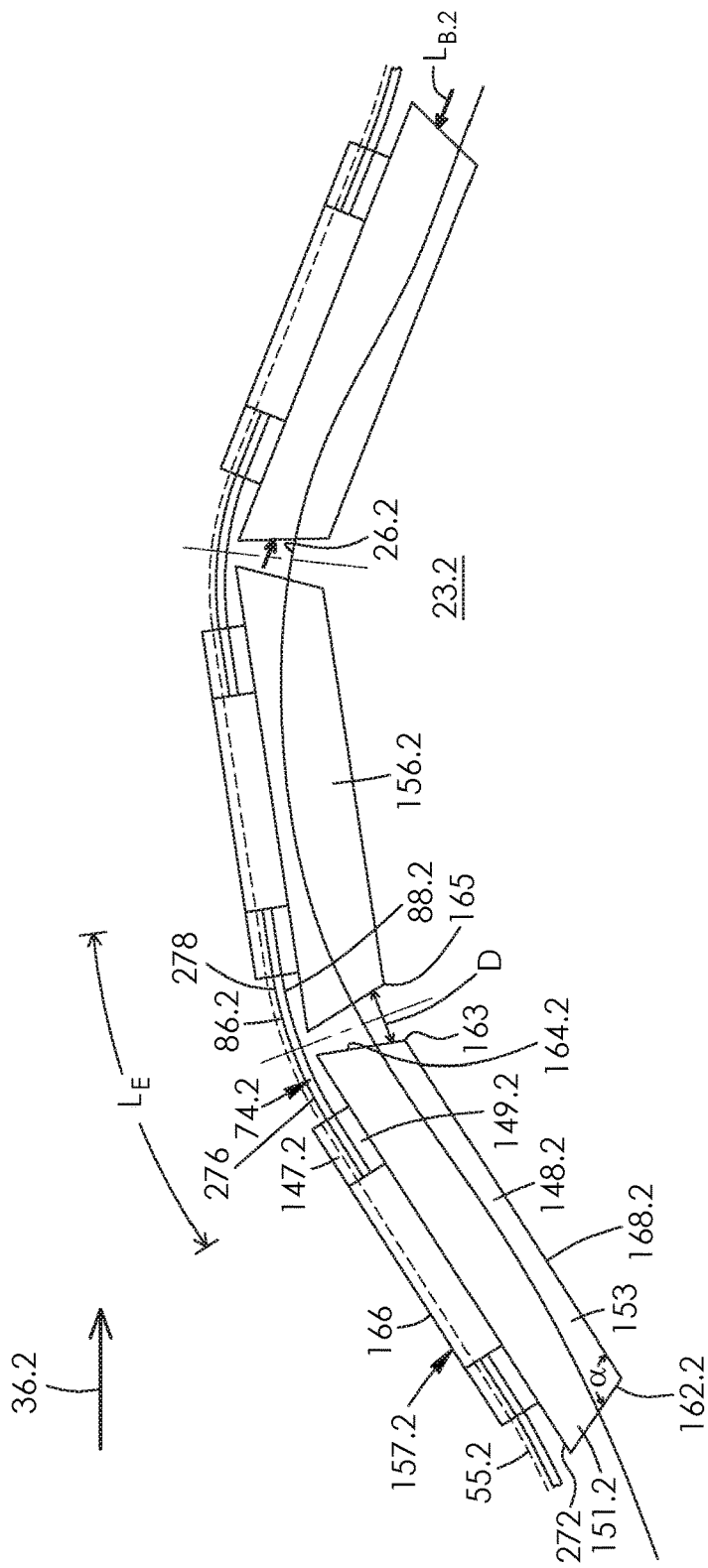
FIG. 15 is a side elevation of a plurality of buoyant planar members for an assembly according to a third aspect, with elastic planar members extending therebetween, outer ones of the elastic planar members being shown in fragment and a plurality of piezoelectric elements extending along and coupling to the tops and bottoms of the elastic planar members, with the buoyant planar members allowing the length of the elastic planar members to be longer than the gap between the buoyant planar members.

FIG. 15 shows part of an assembly 20.2 for generating energy from waves according to a third aspect. Assembly 20.2 is substantially the same as assembly 20.1 of FIGS. 9 to 14, with like parts having like numbers and functions as the assembly 20.1 shown in FIGS. 9 to 14 with decimal extension "0.2" replacing decimal extension "0.1", and being added for numbers not previously having decimal extensions, with the following exceptions.

The bottom portions 151.2 of the buoyant planar members 148.2 are isosceles trapezoids in side cross-section in this example. Each of the bottom portions of the buoyant planar members has an upper planar surface 272 spaced-apart from and larger in area compared to the planar bottom 168.2 of the buoyant planar member. The ends 162.2 and 164.2 of the buoyant planar members are tapered and extend between the top portions 157.2 and bottom portions 151.2 of the buoyant planar member. Adjacent ends of respective buoyant planar members face each other. The ends 162.2 and 164.2 extend outwards and upwards from the planar bottom to the upper planar surface 272 at an obtuse angle α relative to the planar bottom so that the bottom corners 163 and 165 of adjacent buoyant planar members 148.2 and 156.2 do not hit each other as they go over the tops of the waves. Each bottom portion 151.2 of the buoyant planar members is a lighter, box-like structure in this example.

The slabs 147.2 and 149.2 are inwardly spaced from the ends 162.2 and 164.2 of the buoyant planar members 148.2. Portions 276 and 278 of the planar members 74.2 thus extend above and overlap with the upper planar surfaces 272 of the bottom portions 151.1 of the buoyant planar members. The elastic planar members 74.2 are thus longer, as shown by length $L_E$, than the distance D between the buoyant planar members 148.2 and 156.2. In other words, the distance between the top portions 157.2 of the respective buoyant planar members 148.2 and 156.2 is greater than the distance between the ends of the respective buoyant planar members.

This capability may enable more flexibility in the design of the beam/piezo systems, for example, by allowing the stresses in the piezo/beam to be limited without causing too large a spacing between the buoyant planar members 148.2 and 156.2. Assembly 20.2 may be a more suitable embodiment for large scale energy generation.

On a large system tapping the energy in ocean waves, the DC power produced would preferably have to be converted to AC and transformed to a higher voltage at the buoy in order to minimise losses in transmitting the energy to the shore, where it could be then preferably be transformed to higher voltages to supply local communities or to feed into the grid.

One may model the wave shape as a sine wave and with this, it is possible using standard elastic beam theory to obtain an expression for the energy required to bend the laminated continuous elastic planar member of assembly 20 into this shape. The energy to produce the bending comes from the waves. Since the piezoelectric elements form the outer layers of the elastic planar members, a large part of the energy is stored in them as they are stretched and compressed more than the elastic planar core. However as the wave passes and the bending stresses are relieved, the energy is not completely returned to the wave as it would be with a simple elastic beam. Rather, close to a half of the energy in the piezoelectric elements, depending on their orientation, may be converted into electricity. Having therefore the equations for the energy involved and knowing the wave speed and frequency, one may calculate a power level. Also by essentially applying the same process to the second diminished wave and successively smaller third, fourth waves, etc. as they pass under the assembly, one may predict the energy from a whole array and the energy left in the waves when the waves exit the assembly. The modified analysis for the case with a plurality of buoyant planar members of assemblies 20.1 and 20.2 is based on the assumption that when the relatively short laminated elastic planar members are all joined together, they form a single wave shape which is similar to the wave itself but reduced in scale by the factor of its length to the wave length. The thicknesses of the elastic planar core and the piezoelectric elements, and the beam length, or length $L_E$ of elastic planar members, can be adjusted to set the optimum power level.

Figure 9:
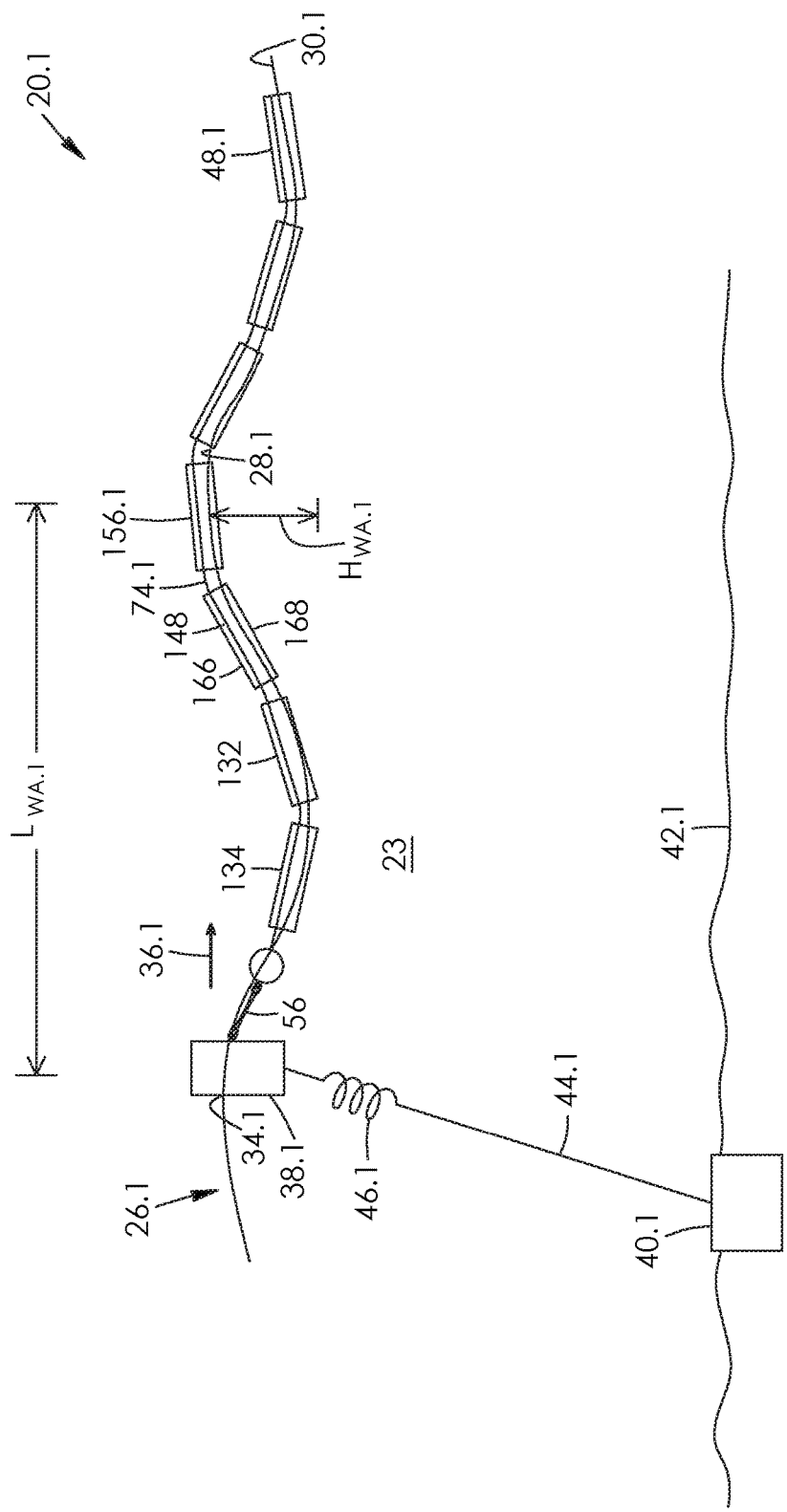
FIG. 9 is a side elevation view of a floating piezoelectric assembly for generating energy from waves according to a second aspect, the assembly includes a plurality of longitudinally spaced-apart buoyant planar members coupled together via elastic planar members.

Based on an analysis of the bending of the laminated piezo/carbon-fibre beam by the action of the waves, the electrical energy generated thereby can be estimated. Referring to FIG. 9, the following is a prediction of the energy that should be obtained by assembly 20.1 for a situation where an ocean wave of ten horsepower per foot (along the wave), of a wavelength $L_{WA.1}$ of 22 meters, with a period of 3.1 seconds, and a wave height $H_{WA.1}$ of 2.6 meters, with the wave-interacting portion 48.1 of the assembly 20.1 seen in FIG. 13, and having a width $W_{WT.1}$ of 50 meters long along the wave and a length $L_{WT.1}$ of 66 metres (three wave lengths) in the direction of the wave motion shown by arrow of numeral 36.1. In this example and referring to FIG. 11, each of the buoyant planar members 148 have a length LB of three to four meters long. The elastic planar members 202 have a length $L_X$ of 0.5 meters between the buoyant planar members 134 and 142 and a thickness $T_E$ seen in FIG. 10A of about 2.53 centimeters or less. The piezoelectric elements 226 in this example have a thickness $T_P$ of about 1.6 millimeters. Such a configuration may remove about half the energy from the waves and should produce 0.5 MW at a cost of about \$200/KW for piezoelectric elements and perhaps twice as much (\$400/KW) for the whole thing. For the sake of comparison, recently installed turbines at the Mica Dam, a hydroelectric dam owned by BC Hydro® and spanning the Columbia River near Revelstoke, British Columbia, Canada, recently cost \$500/KW. The above calculations thus evidence that the assemblies herein described may comprise a promising solution for a medium scale green energy power system. It is foreseen that such costs will lower further should piezoelectric element costs decrease in the future. Also such units or larger ones located at numerous suitable locations could generate as much energy as the Mica Dam.

Figure 16:
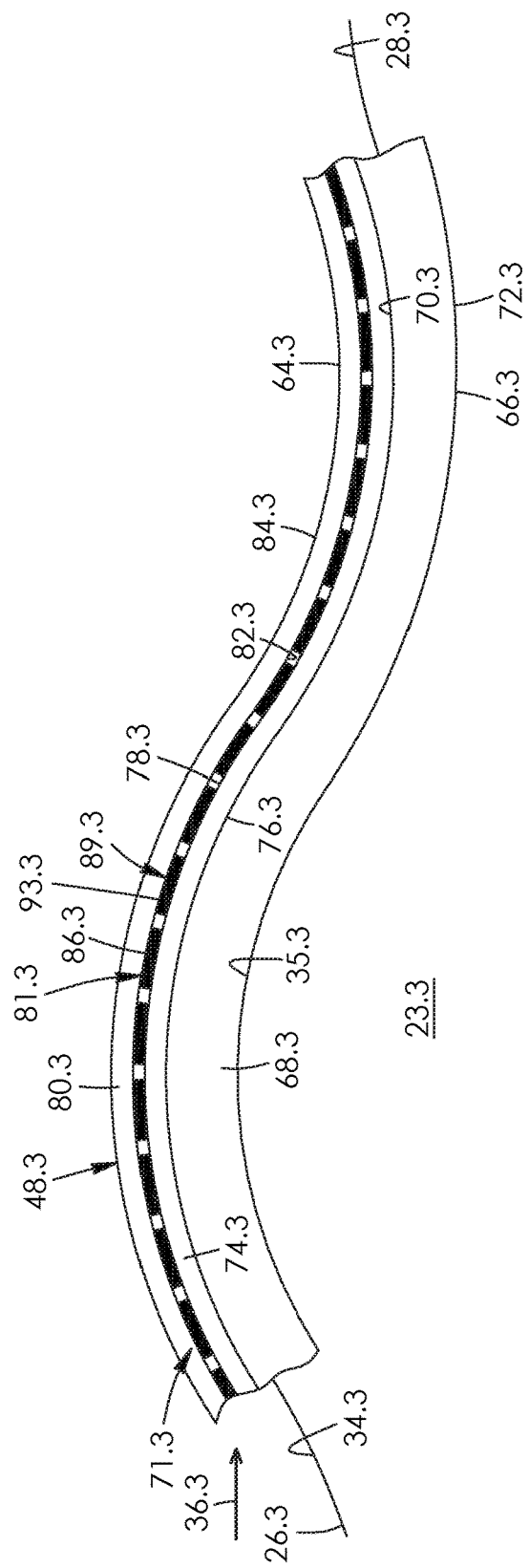
FIG. 16 is a partial side elevation view of a floating piezoelectric assembly for generating energy from waves according to a fourth embodiment, the assembly being shown in fragment.

FIG. 16 shows part of an assembly 20.3 for generating energy from waves according to a fourth aspect. Assembly 20.3 is substantially the same as assembly 20 of FIGS. 1 to 8, with like parts having like numbers and functions as the assembly 20 shown in FIGS. 1 to 8 with decimal extension "0.3" added thereto, with the following exceptions.

For assembly 20.3, the plurality of longitudinally and laterally spaced-apart piezoelectric elements 86.3 and 93.3 extend only along the top 78.3 of elastic planar member 74.3. These are bonded to the elastic planar member while it is in a pre-tensioned condition so that when the tension is later relaxed, the assembly would become curved upwards with the elastic planar member is still under tension and the piezoelectric elements compression. This curvature of the elastic planar member 74.3 would be removed during assembly under the action of the weighted planar member 80.3 when it is added. Also in calm water the assembly would lie flat. This would induce further compression of the piezoelectric elements 86.3 and 93.3 so helping maintain them always in a compressed condition even when the elastic planar member 74.3 is bending over the top of the steepest waves the assembly will encounter. As before, the assembly 20.3 includes two or more piezoelectric elements (in the direction along the waves) in order that discontinuities of bending stiffness associated with the gap between the piezoelectric elements are minimised.

Figure 17:
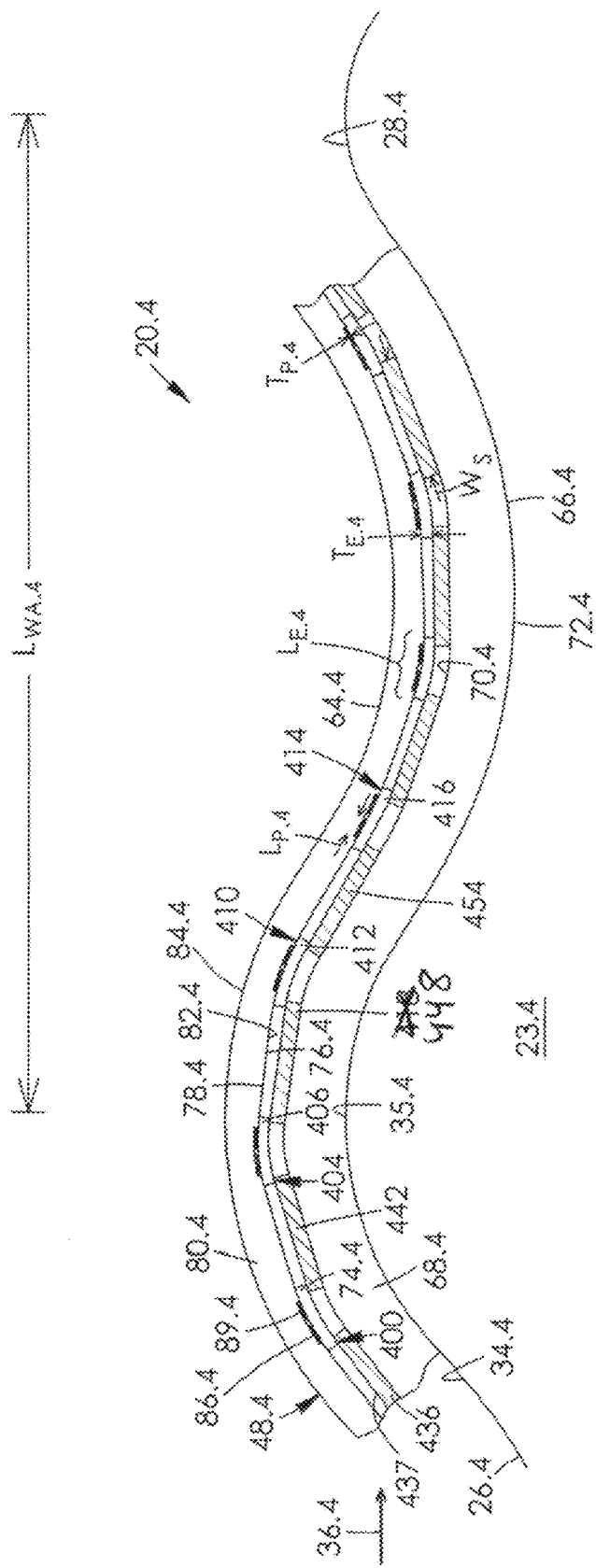
FIG. 17 is a partial side elevation view of a floating piezoelectric assembly for generating energy from waves according to a fifth embodiment, the assembly being shown in fragment.
Figure 18:
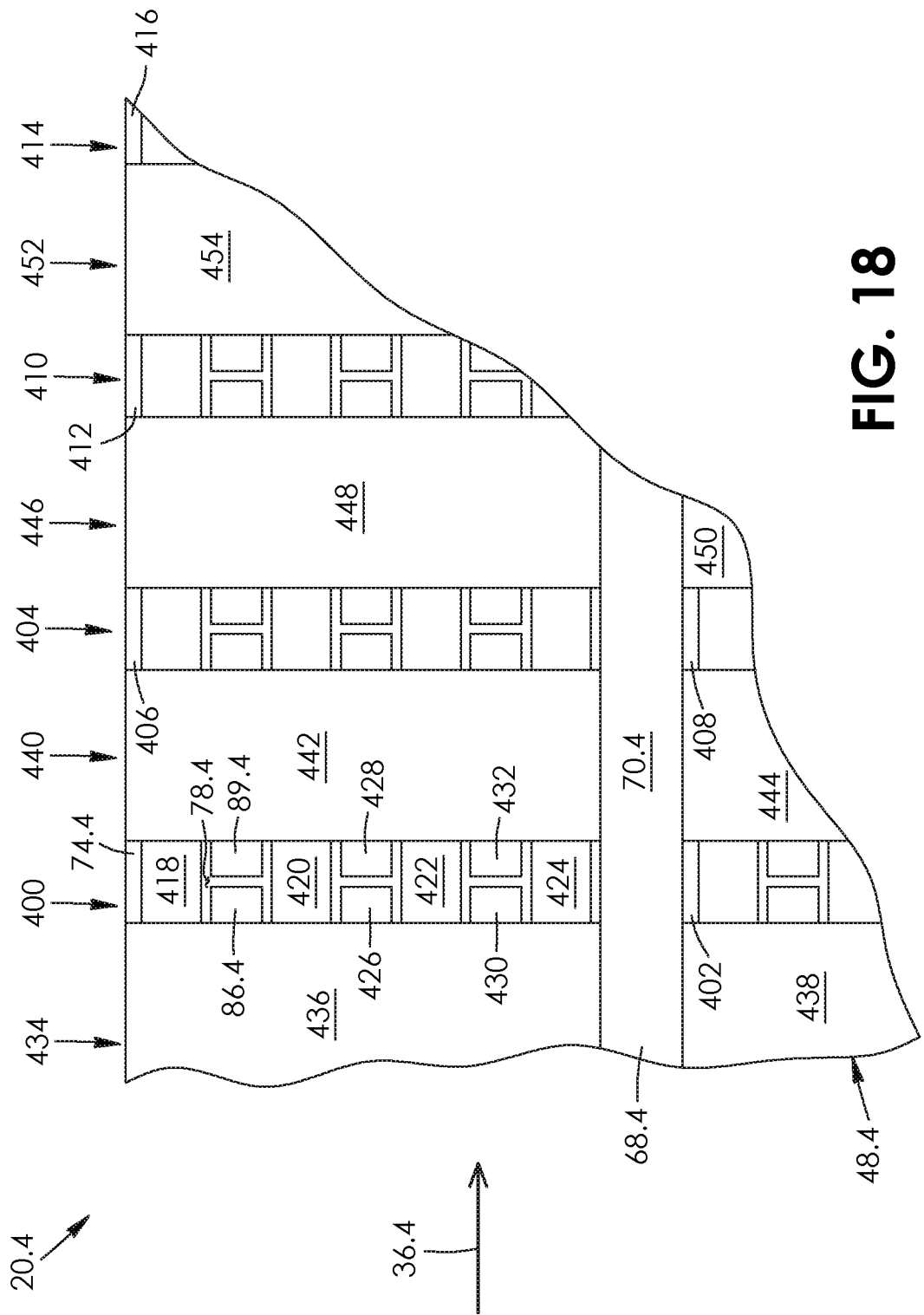
FIG. 18 is a fragmented, top plan view of the assembly of FIG. 17, with a weighted top planar member of the assembly being partially removed to reveal a typical layout of the piezoelectric elements of the assembly on the top of a plurality of longitudinally-extending and spaced-apart elastic planar members of the assembly.

FIGS. 17 to 18 show part of an assembly 20.4 for generating energy from waves according to a fifth aspect. Assembly 20.4 is substantially the same as assembly 20 of FIGS. 1 to 8, with like parts having like numbers and functions as the assembly 20 shown in FIGS. 1 to 8 with decimal extension "0.4" added thereto, with the following exceptions.

As seen in FIG. 18, assembly 20.4 includes a plurality of longitudinally spaced-apart rows of laterally extending and laterally spaced-apart elastic planar members, including a first row 400 of planar members 74.4 and 402, a second row 404 of planar members 406 and 408, a third row 410 of planar members 412, and a fourth row 414 of planar members 416.

Each of the planar members 74.4 includes a plurality of piezoelectric elements coupled thereto on the tops 78.4 thereof, including a first set of piezoelectric elements 418, 420, 422 and 424, with a second set of paired piezoelectric elements 86.4 and 89.4, 426 and 428 and 430 and 432 interposed between adjacent pairs of the first set of piezoelectric elements, in this example. The first set of piezoelectric elements are staggered relative to the second set of piezoelectric elements in this example.

The piezoelectric elements are thus only on the tops 78.4 of the elastic planar members. These are bonded to the elastic planar members 74.4, 406, 412 and 416 while it is in a pre-tensioned condition so that when the tension is later relaxed the assembly would become curved upwards with the beam/elastic-planar member still under tension and the piezoelectric elements in compression. This curvature of the beam would be removed during assembly under the action of the weight planar member 80.4 when it is added. Also in calm water, the assembly 20.4 would lie flat. This induces further compression of the piezoelectric elements so helping maintain them always in a compressed condition even when the elastic planar members are bending over the top of the steepest waves that the assembly may encounter. As before, it should be noted there should be two or more piezoelectric elements in the direction along the waves in order that discontinuities of bending stiffness associated with the gap between the piezoelectric elements are minimised.

Referring to FIG. 18, the assembly 20.4 includes a plurality of longitudinally spaced-apart rows of laterally-extending and laterally spaced-apart planar rigid members, in this example slats, including a first row 434 of slats 436 and 438, a second row 440 of slats 442 and 444, a third row 446 of slats 448 and 450 and a fourth row 452 of slats 454. The rows of slats are interposed between the rows 400, 404, 410 and 414 of elastic planar members.

The slats will function as a means of reducing the number and therefore the cost of the piezoelectric elements that would be needed. The assembly 20.4 thus includes the addition of relatively thin but stiff slats at regular intervals along the length of the elastic planar members 74.4, 406, 412, and 416. The width Ws of the slats in the direction of the wave motion is shaped to be at least four or five times less than the wavelength $L_{WA.4}$ of the smallest wave from which the assembly 20.4 is being designed to extract energy. In this manner, as the assembly rides over the waves, the slats 436, 442, 448, and 454 tilt relative to each other, causing the piezoelectric elements 86.4 and 90.4 and elastic planar members 74.4, 406, 412, and 416 between the slats to bend. The lengths $L_{P.4}$ of the piezoelectric elements, as well as the lengths $L_{E.4}$ of the elastic planar members will be considerably shorter than the width Ws of the slats so that the above mentioned economy may be achieved. The thickness $T_{P.4}$ of the piezoelectric elements and thickness $T_{E.4}$ of the elastic planar members is thicker as well as shorter than they would be without the slats.

As seen in FIG. 17, the elastic planar members 74.4 extend between and couple to the tops 437 of adjacent ones of the slats 436 and 442.

Figure 19:
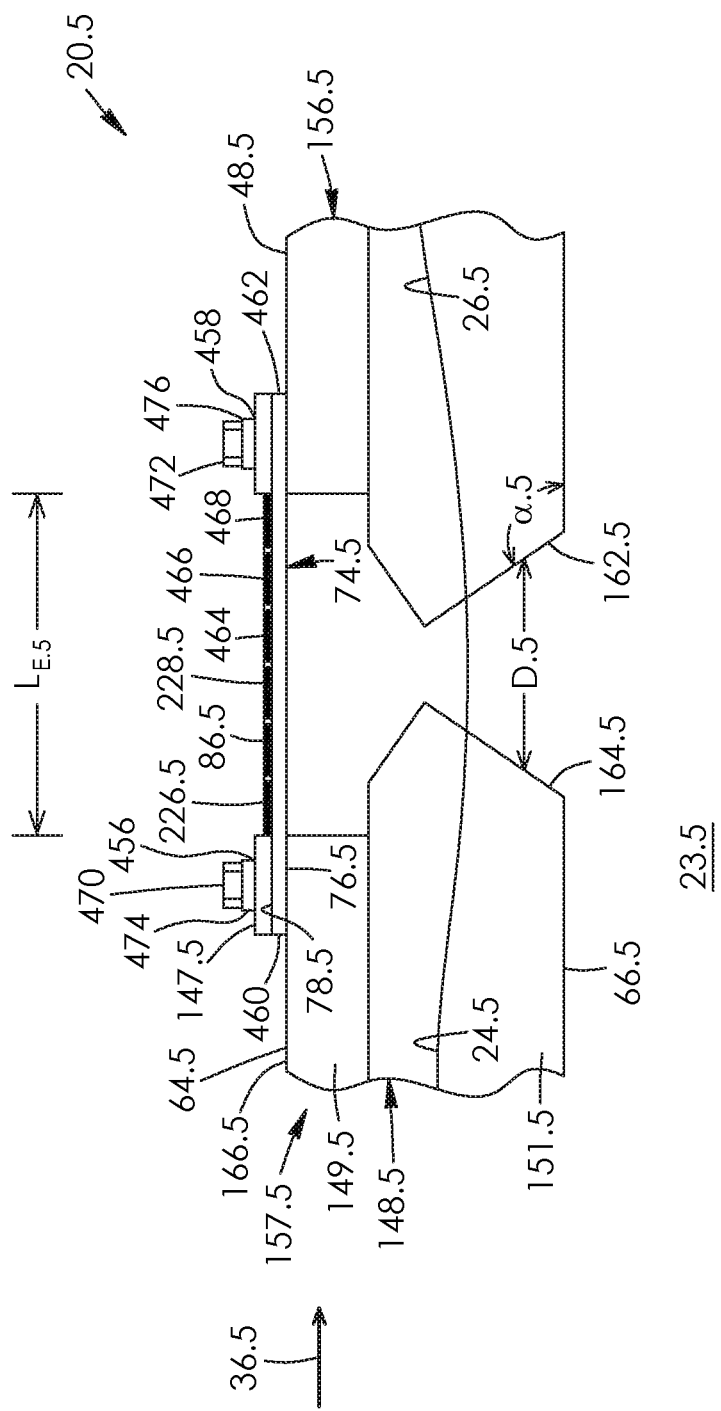
FIG. 19 is a side elevation view of a floating piezoelectric assembly for generating energy from waves according to a sixth embodiment, the assembly including a pair of buoyant planar members shown in fragment, an elastic planar member of coupled to and extending between the buoyant planar members, and a plurality of piezoelectric elements extending along and coupling to the top of the elastic planar member.
Figure 20:
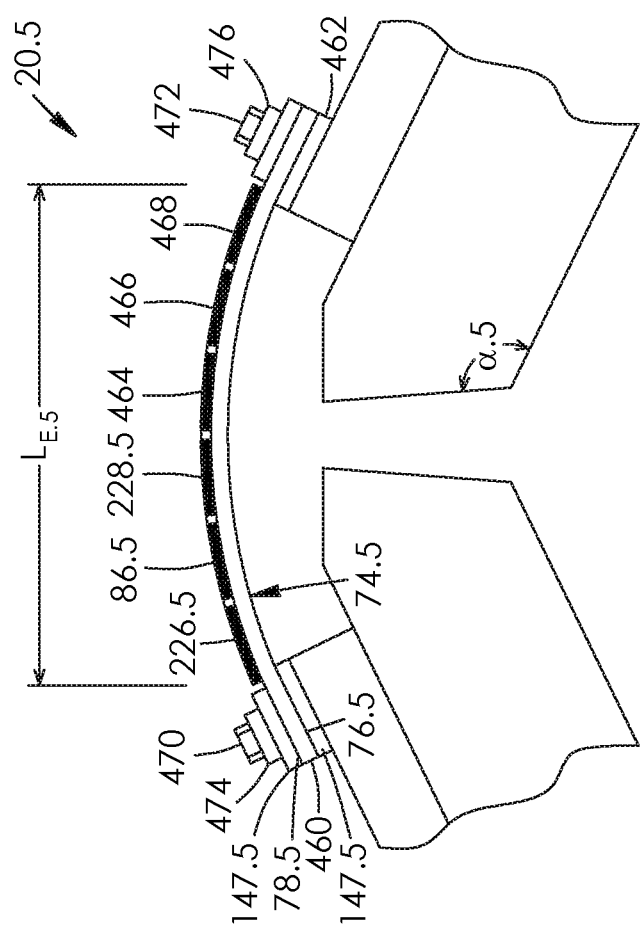
FIG. 20 is a side elevation view of the assembly of FIG. 19, with the elastic planar member being shown in the process of being assembled and being curved due to the pre-stressing of the elastic planar member while the piezoelectric elements are being attached thereto.

FIGS. 19 to 20 show part of an assembly 20.5 for generating energy from waves according to a sixth aspect. Assembly 20.5 is substantially the same as assembly 20.2 of FIG. 15, with like parts having like numbers and functions as the assembly 20.2 shown in FIG. 15 with decimal extension "0.5" replacing decimal extension "0.2" and being added for numbers not previously having decimal extensions, and with the following exceptions.

Referring to FIG. 20, the elastic planar members 74.5 of assembly 20.5 are pre-stressed and subjected to tension while the piezoelectric elements 226.5, 86.5, 228.5, 464, 466, and 468 are bonded thereto in order to increase the compression in the piezo materials. If the piezoelectric elements are mounted on the top of the elastic planer member 74.5 only, the effect of pre-stressing the elastic planar members will be to cause the piezoelectric elements and elastic planar members to develop an upwardly convex curvature as shown in FIG. 20. Thus, each of the elastic planar members 74.5 is curved or arcuate-shaped in this example with concave-shaped bottom 76.5 and a convex-shaped top 78.5.

As seen in FIG. 19, each elastic planar member has a pair of apertures 456 and 458 extending therethrough adjacent to spaced-apart ends 460 and 462 thereof. A plurality of longitudinally and laterally-spaced apart piezoelectric elements 226.5, 86.5, 228.5, 464, 466, and 468 extend along and are coupled to the top 78.5 of the elastic planar members 74.5 at locations between the ends of elastic planar members.

As seen in FIG. 19, the elastic planar members 74.5 couple to and extend between the top portions 157.5 of adjacent buoyant planar members 148.5 and 156.5. In this example, the ends 460 and 462 of the elastic planar members extend between slabs 149.5 and upper plates 147.5 and couple to the buoyant planar members via fasteners, in this example bolts 470 and 472 which extend through washers 474 and 476, and apertures 458 and 458 of the elastic planar members.

When the elastic planar member 74.5 is clamped to the buoyant planar members, the elastic planar member is straightened out until it is in the flat condition shown in FIG. 19. This would be easier to do with the buoyant planar members in calm water at the dock rather than on an assembly. The elastic planar member so flattened causes compressive stress in the piezoelectric elements 226.5, 86.5, 228.5, 464, 466 and 468. Thus, when the assembly 20.5 is assembled and the elastic planar members 74.5 are clamped to the buoyant planar members 148.5 and 156.5, the elastic planar members are straightened again, further increasing in the compression of the piezo material to insure against the possibility of tensile rupture.

Figure 21:
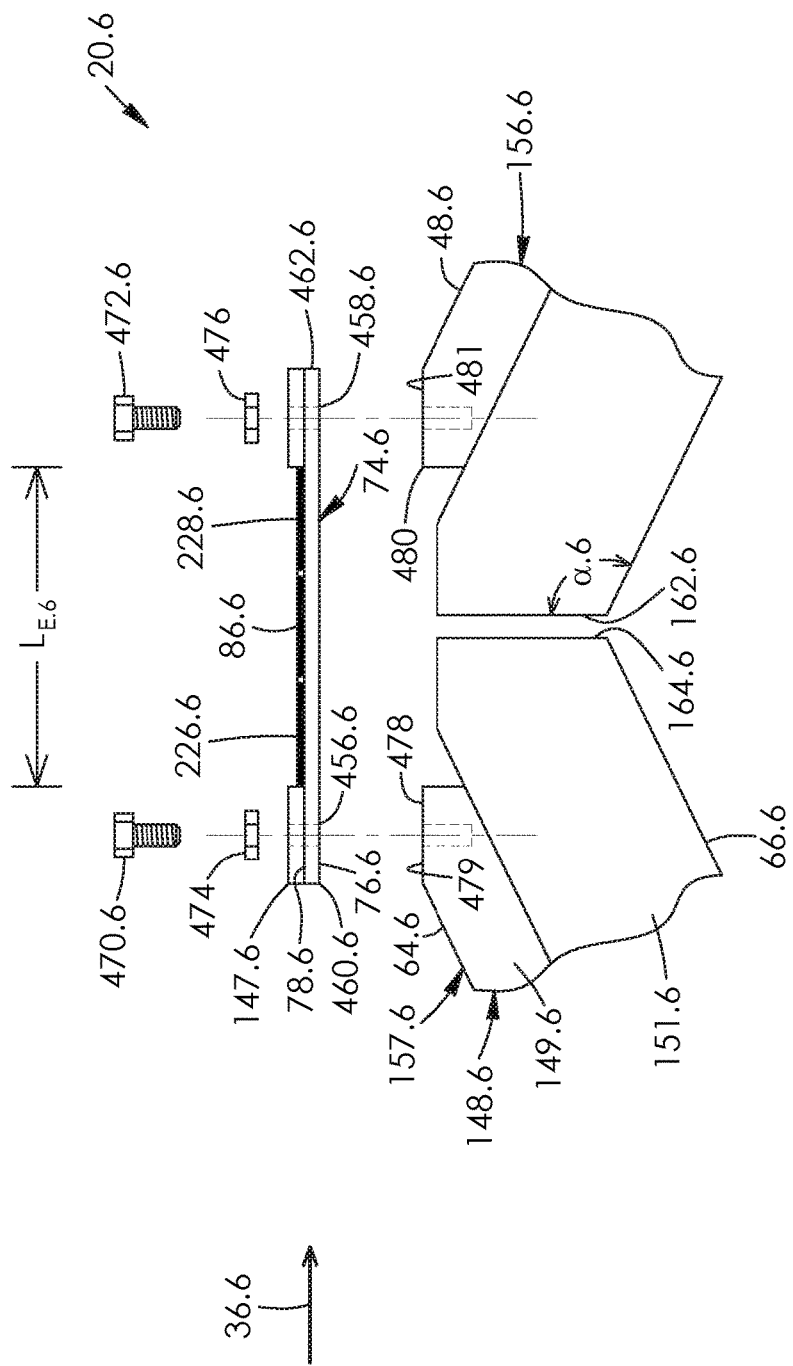
FIG. 21 is a side elevation, exploded view of a floating piezoelectric assembly for generating energy from waves according to a seventh embodiment, the buoyant planar members being shown in fragment, with a generally flat elastic planar member of the assembly in the process of being coupled to the buoyant planar members, and with a plurality of piezoelectric elements extending along and coupling to the top of the elastic planar member.
Figure 22:
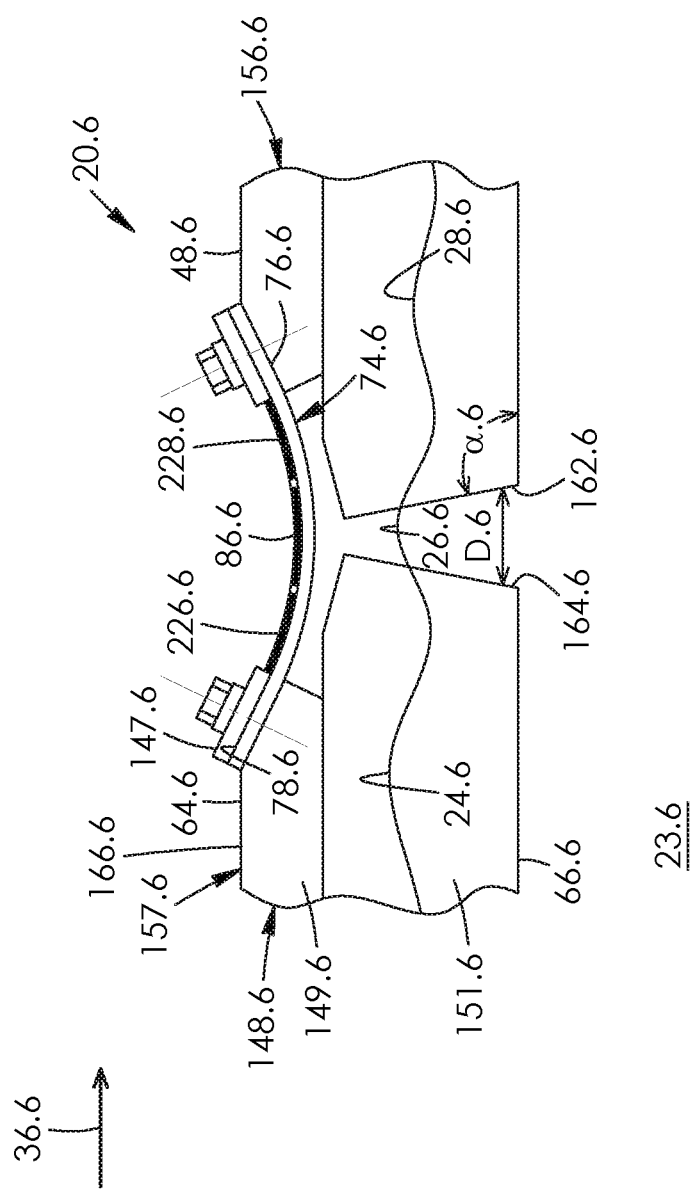
FIG. 22 is a side elevation, exploded view of the assembly of FIG. 21, with the elastic planar member shown coupled to and extending between the buoyant planar members and in the bent state that would exist in calm water.

FIGS. 21 and 22 show part of an assembly 20.6 for generating energy from waves according to a seventh aspect. Assembly 20.6 is substantially the same as assembly 20.5 of FIGS. 19 and 20, with like parts having like numbers and functions as the assembly 20.6 shown in FIGS. 19 and 20 with decimal extension "0.6" replacing decimal extension "0.5" and being added for numbers not previously having decimal extensions, and with the following exceptions.

In this example, the elastic planar members 74.6 are generally flat when disconnected from the assembly 20.6. The top portions 157.6 of the buoyant planar members 148.6 and 156.6 have tapered ends 478 and 480 to which the ends 460.6 and 462.6 of the elastic planar members 74.6 couple. The piezoelectric elements are bonded on just the top 78.6 of the straight elastic planar members 74.6 before clamping the ends 460.6 and 462.6 of the elastic planar members to outward sloping surfaces 479 and 481 on the top portions 157.6 or frames of the buoyant planar members 148.6 and 156.6. As seen in FIG. 22, when the elastic planar members are coupled to the buoyant planar members 148.6 and 156.6 and the buoyant planar members return to their normal horizontal calm water orientation. the elastic planar members are bent downwards between the buoyant planar members, which produces a state of compressive stress in the piezoelectric elements 226.6, 86.6 and 228.6 extending along the tops 78.6.

When the whole assembly is assembled, the piezoelectric elements and elastic planar members are thus curved or 'pre-bent' downwards, thereby inducing tension in the elastic planar members and compression in the piezoelectric elements. It would also be possible to use a combination of pre-stressing and pre-bending in the design of the assembly if that was advantageous.

Figure 23:
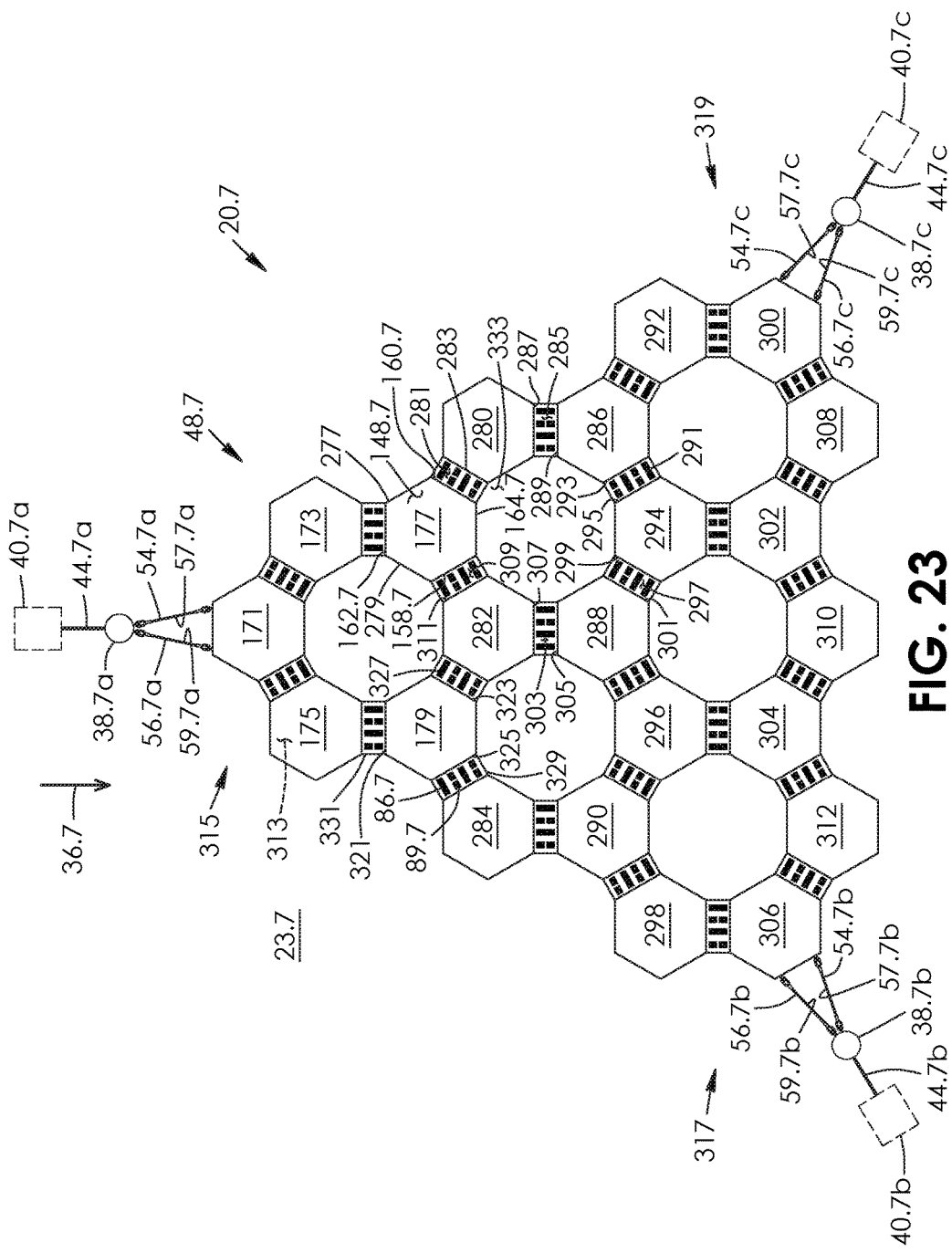
FIG. 23 is a top plan view of a floating piezoelectric assembly for generating energy from waves according to an eighth embodiment, which would be capable of producing energy from waves coming from any direction or from waves coming from more than one direction at the same time, showing the extent of the assembly in relation to the wave direction and seabed, and showing the manner in which the assembly is moored according to one example.

FIG. 23 shows an assembly 20.7 for generating energy from waves according to an eighth aspect. Assembly 20.7 is substantially the same as assembly 20.1 of FIGS. 9 to 14, with like parts having like numbers and functions as the assembly 20.1 shown in FIGS. 9 to 14 with decimal extension "0.7" added thereto, with the following exceptions.

Assembly 20.7 is shaped to function effectively with waves from any direction or in a situation where waves are simultaneously arriving from different directions. The assembly includes a plurality of buoyant planar members 171, 173, 175, 177, 179, 280, 282, 286, 288, 290, 292, 294, 296, 298, 300, 302, 304, 306, 308, 310 and 312 arranged in a hexagonal array. Each of the buoyant planar members includes a top 148.7 and a bottom 313, with the top and the bottom being hexagonal in shape. Each of buoyant planar members 177 includes six sides 162.7, 277, 160.7, 164.7, 158.7 and 279 extending between the top and the bottom thereof, with the sides being substantially equal in size and length.

The assembly 20.7 includes a plurality of elastic planar members, with a first elastic planar member 281 coupling to and extending between the third side 160.7 of a first buoyant planar member 177 and a sixth side 283 of a second buoyant planar member 280. A second elastic planar member 285 couples to and extends between a fourth side 287 of the second buoyant planar member 280 and a first side 289 of a third buoyant planar member 286. A third elastic planar member 291 couples to and extends between a fifth side 293 of the third buoyant planar member 286 and a second side 295 of a fourth buoyant planar member 294. A fourth elastic planar member 297 couples to and extends between a sixth side 299 of the fourth buoyant planar member 294 and a third side 301 of a fifth buoyant planar member 288. A fifth elastic planar member 303 couples to and extends between a first side 305 of the fifth buoyant planar member 288 and a fourth side 307 of a sixth buoyant planar member 282. A sixth elastic planar member 309 couples to and extends between a second side 311 of the sixth buoyant planar member 282 and a fifth side 158.7 of the first buoyant planar member 177.

The assembly 20.7 includes a plurality of piezoelectric elements 86.7 and 89.7 coupled to and extending along the tops of elastic planar members arranged in a manner as previously described in FIGS. 19 to 22 for assemblies 20.5 and 20.6, for example. FIG. 23 shows the piezoelectric elements bonded to the top surfaces of the elastic planar members which extend along the whole of the sides of the buoyant members.

The first sides 321, third sides 323, and fifth sides 325 of the buoyant planar members 179 are evenly spaced-apart from each other, and many of the buoyant planar members have at least elastic planar members 327, 329 and 331 coupled to and extending outwards from the sides 321, 323 and 325. The peripheral buoyant planar members are connected to only two elastic planar members, in this example, as shown by buoyant planar member 280 coupling to elastic planar members 281 and 285.

Thus, for assembly 20.7, the buoyant planar members 171, 173, 175, 177, 179, 280, 282, 286, 288, 290, 292, 294, 296, 298, 300, 302, 304, 306, 308, 310 and 312 are of a hexagonal shape with flexing piezoelectric/elastic planar members on every-other side, i.e. three per buoyant planar member in this example. The assembly may be referred to a series of interconnected groups of six buoyant planar members 177, 280, 286, 294, 288 and 282 surrounding a space 333 where another identical buoyant planar member could have been located but has not been installed.

If installed such that a buoyant planar member would have prevented the ability of any of the rest of the buoyant planar members 177, 280, 286, 294, 288 and 282 to move with the action of the waves. Without it, the buoyant planar members are free to tilt in relation to the ones they are connected to. The result is that an array of such buoyant planar members and flexing piezoelectric/elastic planar members may operate in wave trains arriving from different directions either separately or simultaneously.

The wave-interacting portion 48.7 of the assembly 20.7 is triangular in top profile in this example, with the buoyant planar members and piezoelectric/elastic planar members being arranged in a triangular array. The wave-interacting portion of the assembly is moored at apexes or ends 315, 317 and 319 thereof includes a three anchors 40.7a, 40.7b and 40.7c coupled thereto via cable 44.7a, 44.7b, 44.7c, buoys 38.7a, 38.7b, 38.7c, cables 54.7a, 54.7b, 54.7c and 56.7a, 56.7b, 56.7c, respectively.

Figure 24:
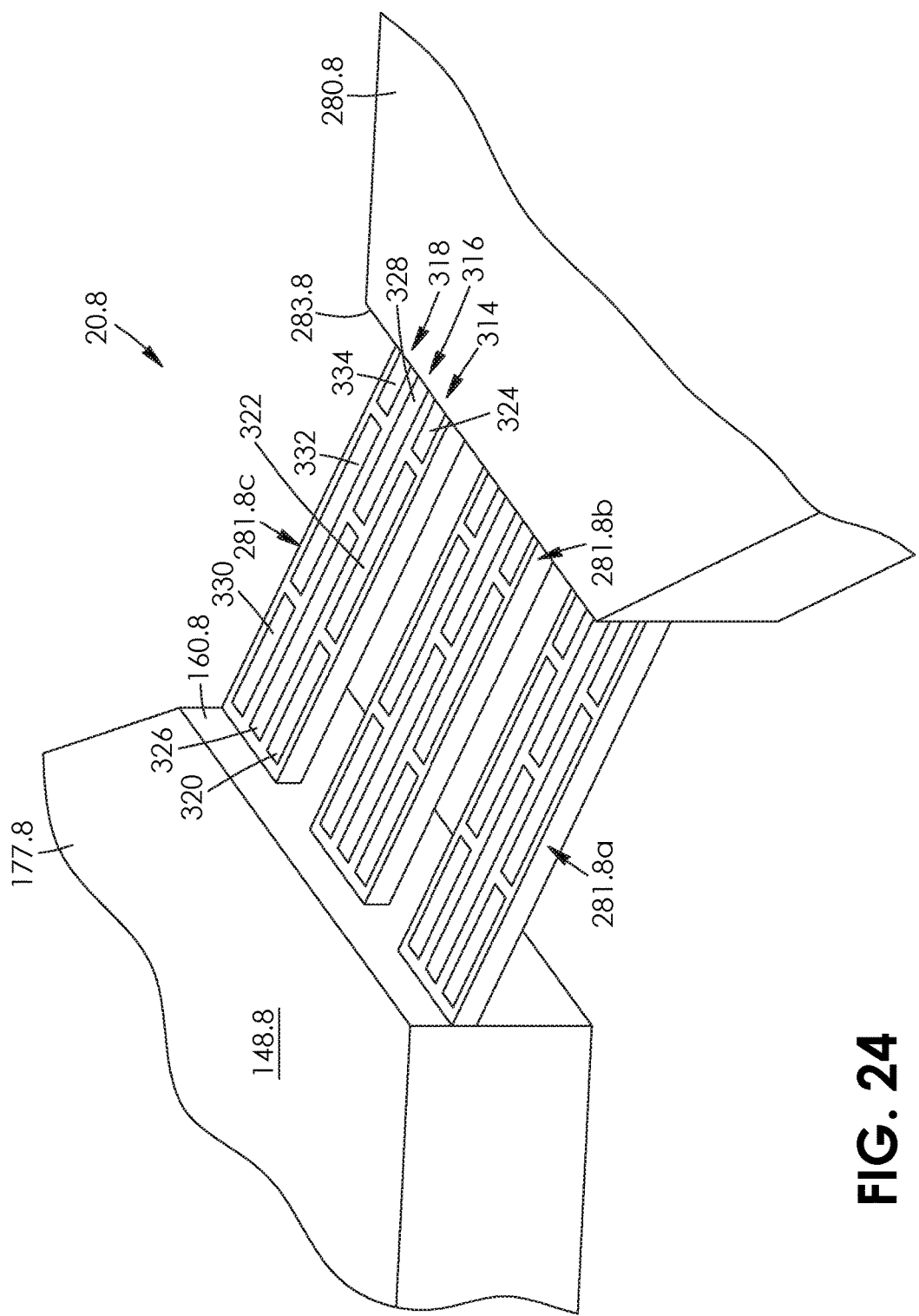
FIG. 24 is an enlarged top perspective view of a floating piezoelectric assembly for generating energy from waves according to a ninth embodiment, the assembly including a pair of buoyant planar members shown in fragment.

FIG. 24 shows an assembly 20.8 for generating electricity from waves according to a ninth aspect. Like parts have like numbers and functions as the assembly 20.7 shown in FIG. 23 with decimal extension "0.8" replacing decimal extension "0.7" and being added for numbers previously not including decimal extensions.

Assembly 20.8 includes a plurality of elastic planar members, in this example three spaced-apart elastic planar members 281.8a, 281.8b and 281.8c coupled to and extending between the sides 160.8 and 283.8 of adjacent buoyant planar members 177.8 and 280.8. Splitting the elastic planar members into two or more smaller members functions to reduce stress in the elastic planar members caused by any motion or twisting due, for example, to wave irregularities. Each of the elastic planar members includes a plurality of longitudinally-extending columns 314, 316 and 318 of longitudinally and laterally spaced apart piezoelectric elements 320, 322 and 324, 326 and 328, and 330, 332 and 334, respectively, bonded to the elastic planar members in a manner described in for assemblies 20.5 to 20.7, for example.

Figure 25:
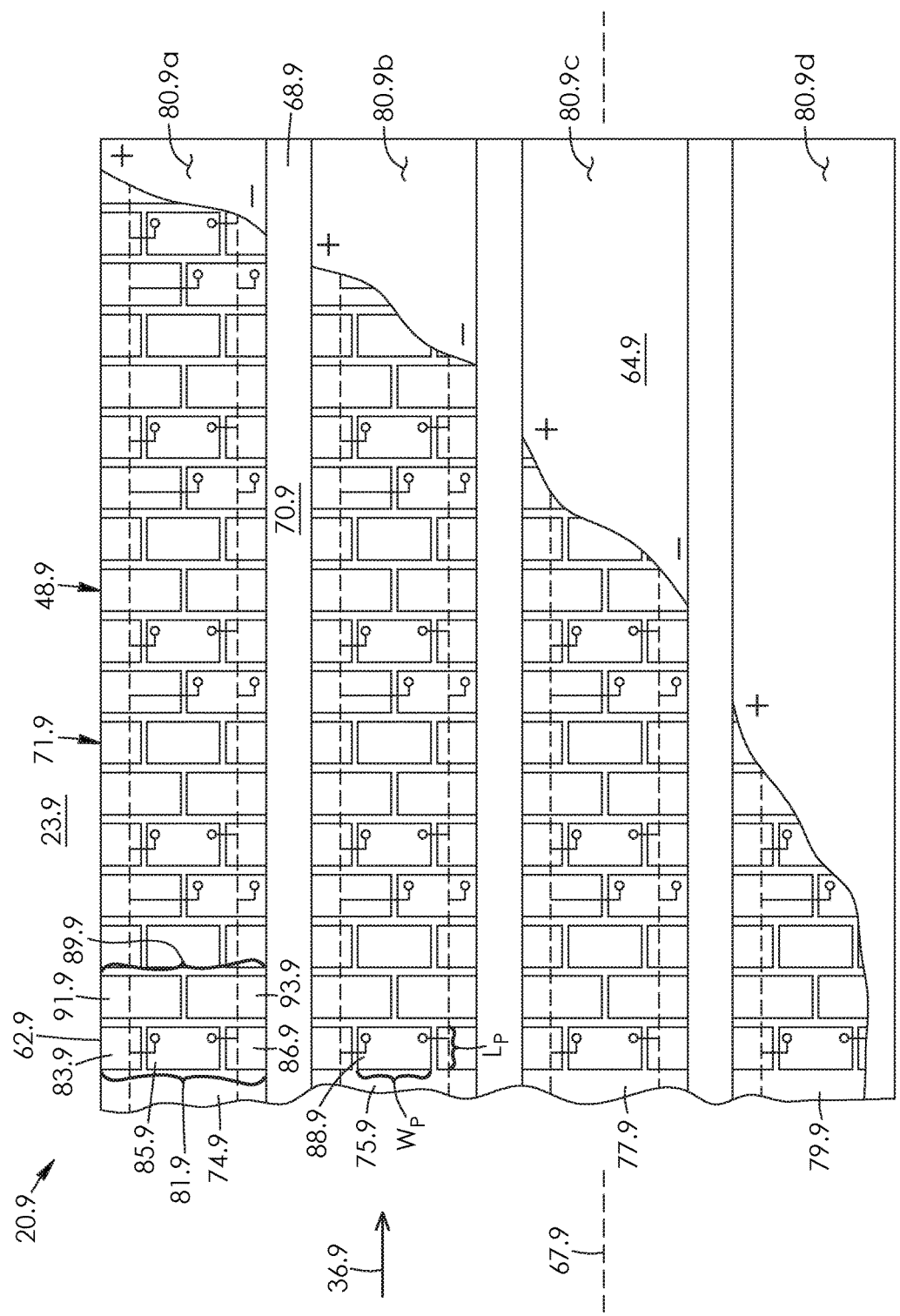
FIG. 25 is a fragmented, top plan view of a floating piezoelectric assembly for generating energy from waves according to a tenth embodiment, the assembly includes a plurality of weighted top planar member strips shown partially removed to reveal a typical layout of the piezoelectric elements of the assembly on the top of a plurality of longitudinally-extending and spaced-apart elastic planar members of the assembly.

FIG. 25 shows an assembly 20.9 for generating electricity from waves according to a tenth aspect. Like parts have like numbers and functions as the assembly 20 shown in FIGS. 1 to 8 with the addition of decimal extension "0.9". In this embodiment, assembly 20.9 includes a plurality of strips of weighted planar members 80.9a, 80.9b, 80.9c and 80.9d which are co-planar with, co-extensive with and of the same width as the strips of elastic planar members 74.9, 75.9, 77.9 and 79.9, respectively.

The term piezoelectric element as herein described may also be referred to as a piezoelectric device.

The assemblies as herein described may used for generating alternating current or direct current. For an alternating current system, the assembly may further include an oscillator (not shown) and transformer (not shown) on the buoy, for example.

ADDITIONAL DESCRIPTION

Examples of assemblies for generating energy from waves have been described. The following clauses are offered as further description.
(1) A blanket-like assembly for generating energy from waves, the assembly comprising: a planar, lower layer made of buoyant material; a planar, upper layer made of weighted material; and a plurality of spaced-apart piezoelectric/elastic elements between the planar, lower layer and the planar, upper layer.
(2) The assembly of clause 1 wherein the elastic elements are pre-stressed so as to ensure a state of compressive stress in the piezoelectric component, and wherein the assembly further includes a planar elastic layer coupled to and between the planar, lower layer and the planar, upper layer of the assembly, the planar elastic layer having a planar top and the piezoelectric elements coupling to the top.
(3) An assembly for generating energy from waves, the assembly comprising: a buoyant planar member that is flexible; and a plurality of piezoelectric elements that are operatively coupled to an elastic planar member extending along the buoyant planar member.
(4) The assembly of clause 3 with the piezoelectric/elastic planar member that extends along and operatively couples to the buoyant planar member and is operatively coupled to that layer.
(5) The assembly of clause 3 further including a flexible weighted planar member operatively coupled above the piezoelectric/elastic planar member.
(6) The assembly of clause 3 wherein the assembly has a longitudinal axis and wherein the plurality of piezoelectric elements are arranged in a plurality of longitudinally spaced-apart rows of laterally-spaced said piezoelectric elements.
(7) The assembly of any one of clauses 3 to 6 wherein the assembly blankets an area of a plurality of waves and flexes to maintain intimate contact between the assembly and the water.
(8) The assembly of any one of clauses 3 to 6, wherein the assembly has a longitudinally axis, wherein the plurality of piezoelectric elements comprises a first layer of piezoelectric elements and a second layer of piezoelectric elements spaced-apart from the first layer of piezoelectric elements, wherein each said piezoelectric element of the first layer of piezoelectric elements is separated by an elastic planar member from the second layer of piezoelectric elements and is longitudinally staggered relative to the piezoelectric elements of the second layer of piezoelectric elements.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. An assembly for generating energy from waves, the assembly having a longitudinal axis and comprising:
   a plurality of longitudinally spaced-apart rows of elongate, laterally spaced-apart buoyant planar members, the buoyant planar members of each said row being staggered relative to the buoyant planar members of each adjacent said row of buoyant planar members;
   a plurality of longitudinally spaced-apart rows of laterally spaced-apart elastic planar members between said rows of the buoyant planar members, each said elastic planar member coupling to and extending between a pair of adjacent said buoyant planar members from adjacent said rows of buoyant planar members; and
   a plurality of longitudinally spaced-apart rows of laterally spaced-apart piezoelectric elements, each said elastic planar member including one or more said piezoelectric elements coupled thereto.

2. The assembly as claimed in claim 1 wherein the buoyant planar members are configured to float along the surface of said waves.

3. The assembly as claimed in claim 1 further including a diode bridge circuit electrically coupled to at least one said piezoelectric element, and a pair of conductors electrically coupled to said diode bridge circuit such that when the waves pass below the assembly, the at least one said piezoelectric element bends and electricity is generated and passes through the conductors.

4. The assembly as claimed in claim 1 wherein each said piezoelectric element has a length measured in the direction that the waves are travelling and wherein said length is shaped to be equal to or less than one quarter of the length of the smallest wavelength of the smallest said wave from which the assembly is being designed to extract power.

5. The assembly as claimed in claim 1, wherein the buoyant planar members are shaped to promote bending of the elastic planar members and wherein electricity is generated thereby.

6. The assembly as claimed in claim 5 wherein each said piezoelectric element is pre-stressed so as to promote a state of compressive stress therein.

7. The assembly as claimed in claim 1, wherein each said buoyant planar member has a length measured in the direction in which the waves are travelling and wherein said length is shaped to be equal to or less than four times the wavelength of a smallest said wave from which the assembly is being designed to extract power.

8. The assembly as claimed in claim 1 wherein the piezoelectric elements of each said row thereof are staggered relative to the piezoelectric elements of each adjacent said row thereof.

9. The assembly as claimed in claim 1 wherein each said elastic planar member has a top and a bottom, wherein the assembly includes a plurality of longitudinally spaced-apart upper rows of laterally spaced-apart said piezoelectric elements coupled to and extending on the top of each said elastic planar member, and wherein the assembly further includes a plurality of longitudinally spaced-apart lower rows of laterally spaced-apart said piezoelectric elements coupled to and extending on the bottom of each said elastic planar member, with the piezoelectric elements of the upper rows of said piezoelectric elements being staggered relative to vertically-aligned said piezoelectric elements of the lower rows of said piezoelectric elements.

10. The assembly as claimed in claim 1 wherein each said buoyant planar member has a planar bottom and a tapered end which, in use, extends upwards at an obtuse angle relative to the planar bottom thereof.

11. The assembly as claimed in claim 1 wherein each said buoyant planar member includes a bottom portion, a top portion and an end extending between the bottom portion thereof and the top portion thereof, the ends of adjacent said buoyant planar members facing each other, wherein the elastic planar members couple to and extend between the top portions of the buoyant planar members, and wherein the distance between the top portions of adjacent said buoyant planar members is greater than the distance between the ends of adjacent said buoyant planar members.

12. The assembly as claimed in claim 1 wherein each of the buoyant planar members includes a top portion with a tapered end to which a respective said elastic planar member couples.

13. The assembly as claimed in claim 1 wherein each said elastic planar member has a top and a bottom, with one of the top and the bottom thereof being outwardly concave in shape, and wherein the piezoelectric elements are coupled to said one of the tops and the bottoms of the elastic planar members to promote compression on the piezoelectric elements.

14. The assembly as claimed in claim 1 wherein adjacent ends of adjacent said buoyant planar members face each other and are tapered.

15. The assembly as claimed in claim 1 wherein each said elastic planar member is bent downwards between adjacent said buoyant members, thereby producing a state of compressive stress in the piezoelectric elements.

16. The assembly as claimed in claim 1 wherein the buoyant members induce tension in the elastic planar members and induce compression in the piezoelectric elements.

17. The assembly as claimed in claim 1 wherein each said elastic planar member has a length extending between adjacent said buoyant planar members and wherein the buoyant planar members are shaped to promote bending along the entire said lengths of the elastic planar members.

18. The assembly as claimed in claim 1, wherein each said elastic planar member is shaped to promote bending thereof.

19. The assembly as claimed in claim 1 wherein the elastic planar members bend under action of the waves, wherein the elastic planar members are shaped to promote bending of the piezoelectric elements and wherein electricity is generated by said bending.

20. The assembly as claimed in claim 1 wherein each said elastic planar member is spaced-apart above the surfaces of the waves.

\* \* \* \* \*